(12) United States Patent
Asakawa et al.

(10) Patent No.: US 10,497,966 B2
(45) Date of Patent: Dec. 3, 2019

(54) SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicants: Murata Manufacturing Co., Ltd., Kyoto (JP); Hydro-Quebec, Montreal (CA)

(72) Inventors: Yuichiro Asakawa, Saitama (JP); Karim Zaghib, Quebec (CA); Shinichi Uesaka, Quebec (CA); Jean-Christophe Daigle, Quebec (CA)

(73) Assignees: Murata Manufacturing Co., Ltd., Kyoto (JP); Hydro-Quebec, Montreal (CA)

( * ) Notice: Subject to any disclaimer, the term of this patent is extended or adjusted under 35 U.S.C. 154(b) by 155 days.

(21) Appl. No.: 15/676,493

(22) Filed: Aug. 14, 2017

(65) Prior Publication Data
US 2018/0183093 A1    Jun. 28, 2018

Related U.S. Application Data

(60) Provisional application No. 62/438,109, filed on Dec. 22, 2016.

(51) Int. Cl.
| | |
|---|---|
| *H01M 10/05* | (2010.01) |
| *H01M 4/48* | (2010.01) |
| *H01M 10/0525* | (2010.01) |
| *H01M 4/485* | (2010.01) |
| *H01M 10/0567* | (2010.01) |
| *H01M 10/42* | (2006.01) |
| *B25F 5/00* | (2006.01) |
| *H01M 4/02* | (2006.01) |

(52) U.S. Cl.
CPC ....... *H01M 10/0525* (2013.01); *H01M 4/485* (2013.01); *H01M 10/0567* (2013.01); *H01M 10/425* (2013.01); *B25F 5/00* (2013.01); *H01M 2004/027* (2013.01); *H01M 2010/4271* (2013.01); *H01M 2300/0025* (2013.01)

(58) Field of Classification Search
None
See application file for complete search history.

(56) References Cited

U.S. PATENT DOCUMENTS

| | | | | |
|---|---|---|---|---|
| 5,378,560 A | * | 1/1995 | Tomiyama | H01M 4/485 429/217 |
| 2011/0311866 A1 | | 12/2011 | Lim et al. | |
| 2012/0202125 A1 | | 8/2012 | Han | |
| 2012/0244410 A1 | | 9/2012 | Kawashima et al. | |

(Continued)

FOREIGN PATENT DOCUMENTS

JP    2014022191 A  *  2/2014

OTHER PUBLICATIONS

JP-2014022191-A English machine translation (Year: 2014).*
International Search Report dated Jan. 10, 2018 for International Application No. PCT/JP2017/031076.

*Primary Examiner* — Scott J. Chmielecki
(74) *Attorney, Agent, or Firm* — K&L Gates LLP

(57) ABSTRACT

There is provided a secondary battery including: a cathode; an anode including a titanium-containing compound; and an electrolytic solution including a dicarbonyl compound. A content of the dicarbonyl compound is from 0.01 wt % to 5 wt % both inclusive.

12 Claims, 8 Drawing Sheets

(56) References Cited

U.S. PATENT DOCUMENTS

| | | |
|---|---|---|
| 2014/0234727 A1 | 8/2014 | Abe et al. |
| 2015/0070024 A1* | 3/2015 | Kim ...................... H01M 10/48 |
| | | 324/430 |
| 2015/0125761 A1 | 5/2015 | Shimamoto et al. |
| 2017/0352882 A1* | 12/2017 | Miki ....................... H01M 4/36 |

* cited by examiner

SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS-REFERENCE TO RELATED APPLICATION

This application claims priority to U.S. Provisional Patent Application No. 62/438,109, filed on Dec. 22, 2016, the contents of which are incorporated by reference herein in its entirety.

BACKGROUND

The technology relates to a secondary battery including an anode that includes a titanium-containing compound, and to a battery pack, an electric vehicle, an electric power storage system, an electric power tool, and an electronic apparatus each of which uses the secondary battery.

Various electronic apparatuses such as mobile phones have been widely used, and it has been demanded to further reduce size and weight of the electronic apparatuses and to achieve their longer lives. Accordingly, small and lightweight secondary batteries that have ability to achieve high energy density have been developed as power sources for the electronic apparatuses.

Note that applications of the secondary batteries are not limited to the electronic apparatuses described above, and it has been also considered to apply the secondary batteries to various other applications. Examples of such other applications may include: a battery pack attachably and detachably mounted on, for example, an electronic apparatus; an electric vehicle such as an electric automobile; an electric power storage system such as a home electric power server; and an electric power tool such as an electric drill.

The secondary battery includes a cathode, an anode, and electrolytic solution. The configuration of the secondary battery exerts a large influence on battery characteristics. Accordingly, various studies have been conducted on the configuration of the secondary battery.

More specifically, in order to improve characteristics such as cycle characteristics, a lithium-titanium composite oxide ($Li_{4/3}Ti_{5/3}O_4$) is used as an active material of an anode, and maleic anhydride is used as an additive of an electrolytic solution (refer to International Publication No. WO 2013/058235 and International Publication No. WO 2013/168821).

SUMMARY

Specific proposals have been made in order to improve battery characteristics of the secondary battery; however, the battery characteristics of the secondary battery are not sufficient yet. For this reason, there is still room for improvement.

It is therefore desirable to provide a secondary battery that makes it possible to achieve superior battery characteristics, and a battery pack, an electric vehicle, an electric power storage system, an electric power tool, and an electronic apparatus.

According to an embodiment of the technology, there is provided a secondary battery including: a cathode; an anode including a titanium-containing compound; and an electrolytic solution including one or more of respective dicarbonyl compounds represented by the following formulas (1), (2), (3), (4), (5), and (6), a content of the dicarbonyl compound being from 0.01 wt % to 5 wt % both inclusive.

[Chem. 1]

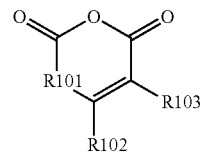

(1)

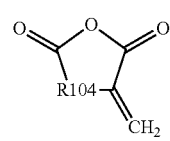

(2)

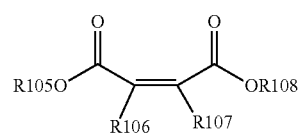

(3)

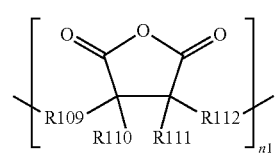

(4)

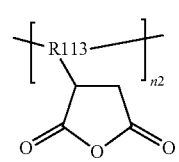

(5)

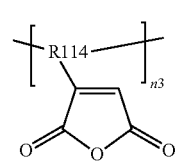

(6)

where each of R101, R104, R109, and R112 is an alkylene group, each of R102, R103, R106, R107, R110, and R111 is one of a hydrogen group, an alkyl group, a carboxyl group, and an alkylcarboxyl group, each of R105 and R108 is one of a hydrogen group, a monovalent hydrocarbon group, a silyl group ($—SiR_3$), and an alkali metal, each of R113 and R114 is a trivalent hydrocarbon group, R101 is optionally absent, and each of R109 and R112 is optionally absent, R102 and R103 are optionally bound to each other, R106 and R107 are optionally bound to each other, R110 and R111 are optionally bound to each other, each of three R's is one of a hydrogen group and a monovalent hydrocarbon group, and each of n1, n2, and n3 is an integer of 2 or more.

According to respective embodiments of the technology, a battery pack, an electric vehicle, an electric power storage system, an electric power tool, and an electronic apparatus each of which includes a secondary battery, and the secondary battery has a configuration similar to that of the foregoing secondary battery according to the embodiment of the technology.

According to the secondary battery of the embodiment of the technology, the anode includes the titanium-containing compound, and the electrolytic solution includes the foregoing predetermined amount of the dicarbonyl compound, which makes it possible to achieve superior battery characteristics. Moreover, in each of the battery pack, the electric vehicle, the electric power storage system, the electric power tool, and the electronic apparatus of the respective embodiments of the technology, similar effects are achievable.

Note that effects described here are non-limiting. Effects achieved by the technology may be one or more of effects described in the technology.

It is to be understood that both the foregoing general description and the following detailed description are exemplary, and are provided to provide further explanation of the technology as claimed.

BRIEF DESCRIPTION OF THE DRAWINGS

The accompanying drawings are included to provide a further understanding of the technology, and are incorporated in and constitute a part of this specification. The drawings illustrate embodiments and, together with the specification, serve to explain the principles of the technology.

DETAILED DESCRIPTION

In the following, some embodiments of the technology are described in detail with reference to drawings. It is to be noted that description is given in the following order.

1. Secondary Battery (Cylindrical Type)
 1-1. Configuration
 1-2. Operation
 1-3. Manufacturing Method
 1-4. Action and Effects
2. Secondary Battery (Laminated Film Type)
 2-1. Configuration
 2-2. Operation
 2-3. Manufacturing Method
 2-4. Action and Effects
3. Applications of Secondary Battery
 3-1. Battery Pack (Single Battery)
 3-2. Battery Pack (Assembled Battery)
 3-3. Electric Vehicle
 3-4. Electric Power Storage System
 3-5. Electric Power Tool <1. Secondary Battery (Cylindrical Type)>

First, description is given of a secondary battery according to an embodiment of the technology.

The secondary battery described here may be a secondary battery using lithium as an electrode reactant. The electrode reactant is a material involving charge-discharge reaction. More specifically, the secondary battery may be, for example, a lithium-ion secondary battery in which battery capacity (capacity of an anode) is obtained with use of a lithium insertion phenomenon and a lithium extraction phenomenon.

<1-1. Configuration>

First, description is given of a configuration of the secondary battery.

Figure 1:
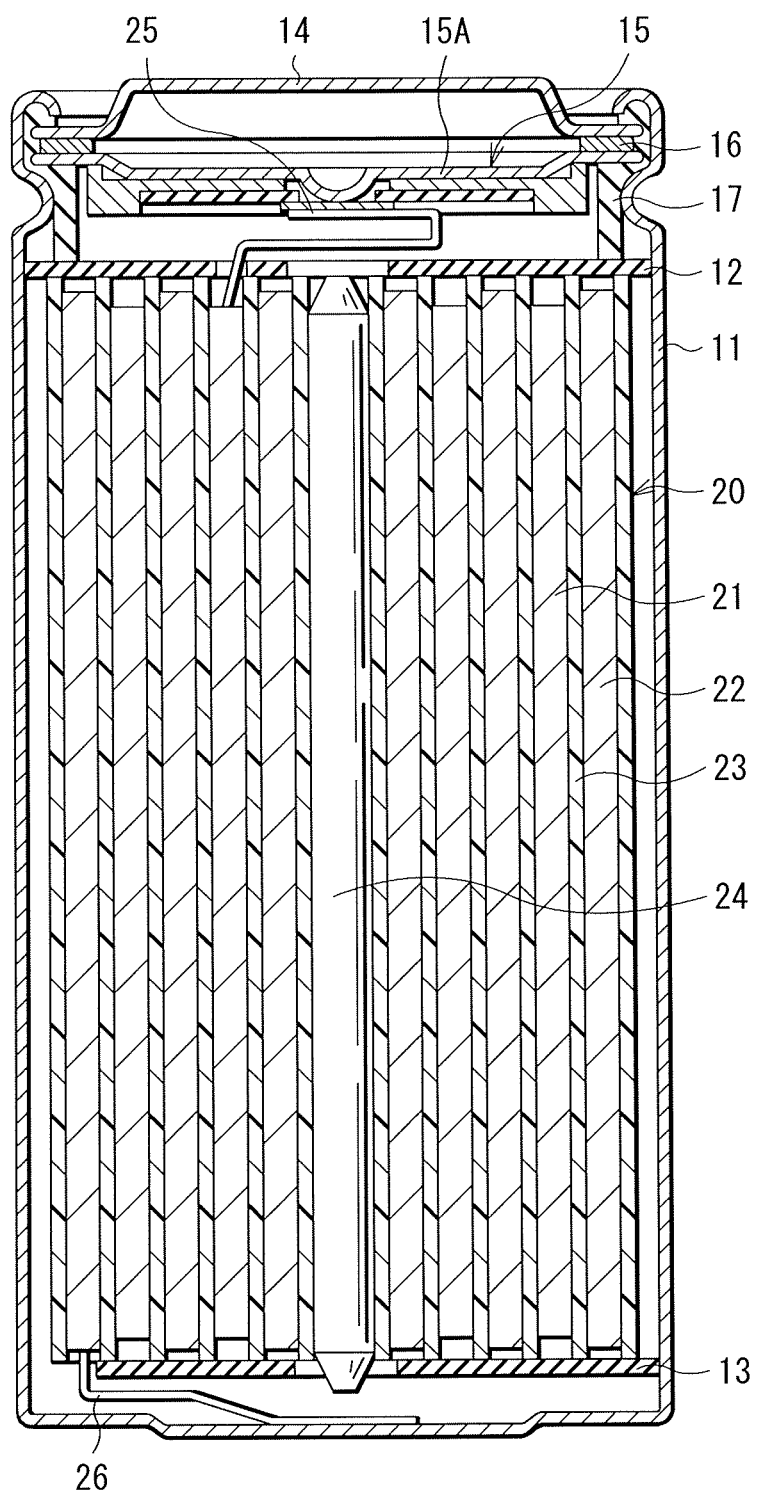
FIG. 1 is a cross-sectional view of a configuration of a secondary battery (cylindrical type) according to an embodiment of the technology.
Figure 2:
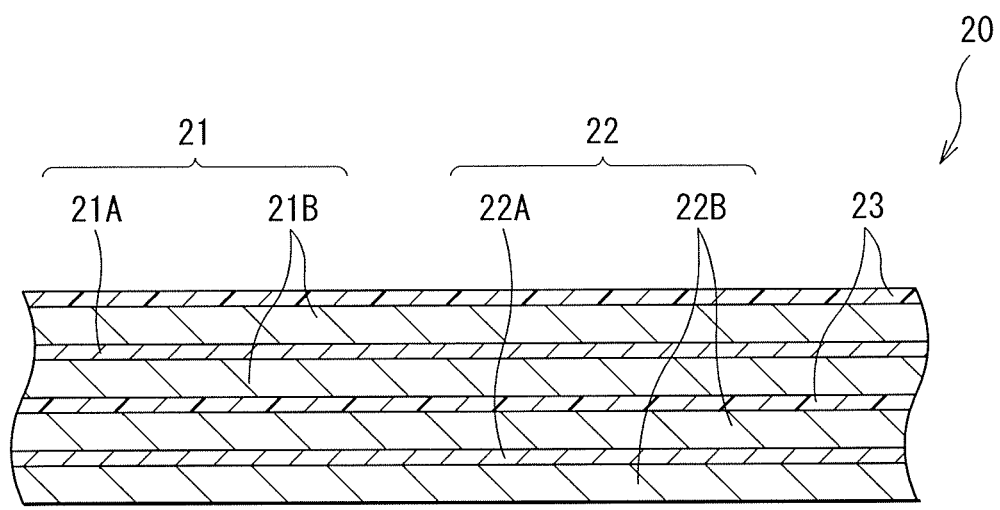
FIG. 2 is an enlarged cross-sectional view of part of a spirally wound electrode body illustrated in FIG. 1.

FIG. 1 illustrates a cross-sectional configuration of a secondary battery. FIG. 2 is an enlarged view of part of a cross-sectional configuration of a spirally wound electrode body 20 illustrated in FIG. 1.

As can be seen from FIG. 1, the secondary battery may be, for example, a cylindrical type secondary battery in which the spirally wound electrode body 20 as a battery element is contained inside a battery can 11 having a substantially hollow cylindrical shape.

[Whole Configuration]

Specifically, the secondary battery may contain, for example, a pair of insulating plates 12 and 13 and the spirally wound electrode body 20 inside the battery can 11, as illustrated in FIG. 1. The spirally wound electrode body 20 may be formed as follows. For example, a cathode 21 and the anode 22 may be stacked with a separator 23 in between, and the cathode 21, the anode 22, and the separator 23 may be spirally wound to form the spirally wound electrode body 20. The spirally wound electrode body 20 may be impregnated with, for example, an electrolytic solution that is a liquid electrolyte.

The battery can 11 may have, for example, a hollow structure in which one end of the battery can 11 is closed and the other end of the battery can 11 is open. The battery can 11 may include, for example, one or more of iron, aluminum, and an alloy thereof. A surface of the battery can 11 may be plated with, for example, a metal material such as nickel. Note that the pair of insulating plates 12 and 13 may be so disposed as to sandwich the spirally wound electrode body 20 in between and extend perpendicularly to a spirally wound periphery surface of the spirally wound electrode body 20.

At the open end of the battery can 11, a battery cover 14, a safety valve mechanism 15, and a positive temperature coefficient device (PTC device) 16 may be swaged with a gasket 17, by which the battery can 11 is hermetically sealed. A formation material of the battery cover 14 may be similar to, for example, a formation material of the battery can 11. Each of the safety valve mechanism 15 and the PTC device 16 may be provided on the inner side of the battery cover 14, and the safety valve mechanism 15 may be electrically coupled to the battery cover 14 via the PTC device 16. In the safety valve mechanism 15, when an internal pressure of the battery can 11 reaches a certain level or higher as a result of, for example, internal short circuit or heating from outside, a disk plate 15A inverts. This cuts electric connection between the battery cover 14 and the spirally wound electrode body 20. In order to prevent abnormal heat generation resulting from a large current, resistance of the PTC device 16 increases as a temperature rises. The gasket 17 may include, for example, an insulating material. A surface of the gasket 17 may be coated with, for example, asphalt.

For example, a center pin 24 may be inserted in a space provided at a center of the spirally wound electrode body 20. However, the center pin 24 may be omitted.

A cathode lead 25 may be attached to the cathode 21. The cathode lead 25 may include, for example, one or more of conductive materials such as aluminum. For example, the cathode lead 25 may be attached to the safety valve mechanism 15, which may be thereby electrically coupled to the battery cover 14.

An anode lead 26 may be attached to the anode 22. The anode lead 26 may include, for example, one or more of conductive materials such as nickel. For example, the anode lead 26 may be attached to the battery can 11, which may be thereby electrically coupled to the battery can 11.

[Cathode]

The cathode 21 may include, for example, a cathode current collector 21A and two cathode active material layers 21B provided on both surfaces of the cathode current collector 21A, as illustrated in FIG. 2. Alternatively, only one cathode active material layer 21B may be provided on a single surface of the cathode current collector 21A.

(Cathode Current Collector)

The cathode current collector 21A may include, for example, one or more of conductive materials. The kind of the conductive materials is not particularly limited; however, non-limiting examples of the conductive materials may include metal materials such as aluminum, nickel, and stainless steel. The cathode current collector 21A may be configured of a single layer or may be configured of multiple layers.

(Cathode Active Material Layer)

The cathode active material layer 21B may include, as a cathode active material, one or more of cathode materials that have ability to insert and extract lithium. It is to be noted that the cathode active material layer 21B may further include one or more of other materials such as a cathode binder and a cathode conductor.

(Cathode Material: Lithium-Containing Compound)

The cathode material may be, for example, a lithium-containing compound, which makes it possible to achieve high energy density. The kind of the lithium-containing compound is not particularly limited; however, non-limiting examples of the lithium-containing compounds may include a lithium-containing composite oxide and a lithium-containing phosphate compound.

The "lithium-containing composite oxide" is a generic name of an oxide that includes lithium (Li) and one or more other elements as constituent elements. The lithium-containing composite oxide may have, for example, one of crystal structures such as a layered rock-salt crystal structure and a spinel crystal structure.

The "lithium-containing phosphate compound" is a generic name of a phosphate compound that includes lithium and one or more other elements as constituent elements. The lithium-containing phosphate compound may have, for example, a crystal structure such as an olivine crystal structure.

It is to be noted that the "other elements" mentioned above are elements other than lithium. The kind of the other elements is not particularly limited; however, non-limiting examples of the other elements may include elements that belong to Groups 2 to 15 in the long form of the periodic table of the elements. Specific but non-limiting examples of the other elements may include nickel (Ni), cobalt (Co), manganese (Mn), and iron (Fe), which make it possible to obtain a high voltage.

Non-limiting examples of the lithium-containing composite oxide having the layered rock-salt crystal structure may include respective compounds represented by the following formulas (21) to (23).

$$Li_aMn_{(1-b-c)}Ni_bM1_cO_{(2-d)}Fe \quad (21)$$

where M1 is one or more of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W), "a" to "e" satisfy $0.8 \leq a \leq 1.2$, $0 < b < 0.5$, $0 \leq c \leq 0.5$, $(b+c)<1$, $-0.1 \leq d \leq 0.2$, and $0 \leq e \leq 0.1$, it is to be noted that the composition of lithium varies depending on charge and discharge states, and "a" is a value in a completely-discharged state.

$$Li_aNi_{(1-b)}M2_bO_{(2-c)}F_d \quad (22)$$

where M2 is one or more of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.8 \leq a \leq 1.2$, $0.005 \leq b \leq 0.5$, $-0.1 \leq c \leq 0.2$, and $0 \leq d \leq 0.1$, it is to be noted that the composition of lithium varies depending on charge and discharge states, and "a" is a value in a completely-discharged state.

$$Li_aCo_{(1-b)}M3_bO_{(2-c)}F_d \quad (23)$$

where M3 is one or more of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.8 \leq a \leq 1.2$, $0 \leq b < 0.5$, $-0.1 \leq c \leq 0.2$, and $d \leq d \leq 0.1$, it is to be noted that the composition of lithium varies depending on charge and discharge states, and "a" is a value in a completely-discharged state.

Specific but non-limiting examples of the lithium-containing composite oxide having the layered rock-salt crystal structure may include LiNiO$_2$, LiCoO$_2$, LiCo$_{0.98}$Al$_{0.01}$Mg$_{0.01}$O$_2$, LiNi$_{0.5}$Co$_{0.2}$Mn$_{0.3}$O$_2$, LiNi$_{0.8}$C$_{0.15}$Al$_{0.05}$O$_2$, LiNi$_{0.33}$Co$_{0.33}$Mn$_{0.33}$O$_2$, Li$_{1.2}$Mn$_{0.52}$Co$_{0.175}$Ni$_{0.1}$O$_2$, and Li$_{1.15}$(Mn$_{0.65}$Ni$_{0.22}$Co$_{0.13}$)O$_2$.

It is to be noted that in a case where the lithium-containing composite oxide having the layered rock-salt crystal structure includes nickel, cobalt, manganese, and aluminum as constituent elements, an atomic ratio of nickel may be preferably 50 at % or more, which makes it possible to achieve high energy density.

Non-limiting examples of the lithium-containing composite oxide having the spinel crystal structure may include a compound represented by the following formula (24).

$$Li_aMn_{(2-b)}M4_bO_cF_d \quad (24)$$

where M4 is one or more of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.9 \leq a \leq 1.1$, $0 \leq b \leq 0.6$, $3.7 \leq c \leq 4.1$, and $0 \leq d \leq 0.1$, it is to be noted that the composition of lithium varies depending on charge and discharge states, and "a" is a value in a completely-discharged state.

Specific but non-limiting examples of the lithium-containing composite oxide having the spinel crystal structure may include $LiMn_2O_4$.

Non-limiting examples of the lithium-containing phosphate compound having the olivine crystal structure may include a compound represented by the following formula (25).

$$Li_aM5PO_4 \qquad (25)$$

where M5 is one or more of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr), "a" satisfies $0.9 \leq a \leq 1.1$, it is to be noted that the composition of lithium varies depending on charge and discharge states, and "a" is a value in a completely-discharged state.

Specific but non-limiting examples of the lithium-containing phosphate compound having the olivine crystal structure may include $LiFePO_4$, $LiMnPO_4$, $LiFe_{0.5}Mn_{0.5}PO_4$, and $LiFe_{0.3}Mn_{0.7}PO_4$.

It is to be noted that the lithium-containing composite oxide may be, for example, a compound represented by the following formula (26).

$$(Li_2MnO_3)_x(LiMnO_2)_{1-x} \qquad (26)$$

where "x" satisfies $0 \leq x \leq 1$, it is to be noted that the composition of lithium varies depending on charge and discharge states, and "x" is a value in a completely-discharged state.

(Other Cathode Materials)

Moreover, non-limiting examples of the cathode materials may include an oxide, a disulfide, a chalcogenide, and a conductive polymer compound.

Non-limiting examples of the oxide may include titanium oxide, vanadium oxide, and manganese dioxide. Non-limiting examples of the disulfide may include titanium disulfide and molybdenum sulfide. Non-limiting examples of the chalcogenide may include niobium selenide. Non-limiting examples of the conductive polymer compound may include sulfur, polyaniline, and polythiophene.

(Cathode Binder)

The cathode binder may include, for example, one or more of synthetic rubbers and polymer compounds. Non-limiting examples of the synthetic rubbers may include a styrene-butadiene-based rubber, a fluorine-based rubber, and ethylene propylene diene. Non-limiting examples of the polymer compounds may include polyvinylidene fluoride and polyimide.

(Cathode Conductor)

The cathode conductor may include, for example, one or more of conductive materials such as carbon materials. Non-limiting examples of the carbon materials may include graphite, carbon black, acetylene black, and Ketjen black. Alternatively, the cathode conductor may be any other material such as a metal material and a conductive polymer, as long as the cathode conductor is a material having conductivity.

[Anode]

The anode 22 may include, for example, an anode current collector 22A and two anode active material layers 22B provided on both surfaces of the anode current collector 22A. Alternatively, only one anode active material layer 22B may be provided on a single surface of the anode current collector 22A.

(Anode Current Collector)

The anode current collector 22A may include, for example, one or more of conductive materials. The kind of the conductive materials is not particularly limited; however, non-limiting examples of the conductive materials may include metal materials such as copper, aluminum, nickel, and stainless steel. The anode current collector 22A may be configured of a single layer or may be configured of multiple layers.

A surface of the anode current collector 22A may be preferably roughened. This makes it possible to improve adhesibility of the anode active material layers 22B with respect to the anode current collector 22A by a so-called anchor effect. In this case, it may be only necessary to roughen the surface of the anode current collector 22A at least in a region facing each of the anode active material layers 22B. Non-limiting examples of a roughening method may include a method of forming fine particles with use of electrolytic treatment. Through the electrolytic treatment, fine particles are formed on the surface of the anode current collector 22A in an electrolytic bath by an electrolytic method to make the surface of the anode current collector 22A rough. A copper foil fabricated by the electrolytic method is generally called "electrolytic copper foil".

(Anode Active Material Layer)

The anode active material layers 22B may include, as an anode active material, one or more of anode materials that have ability to insert and extract lithium. It is to be noted that the anode active material layers 22B may further include one or more of other materials such as an anode binder and an anode conductor.

In order to prevent lithium from being unintentionally precipitated on the anode 22 in the middle of charge, chargeable capacity of the anode material may be preferably larger than discharge capacity of the cathode 21. In other words, electrochemical equivalent of the anode material that has ability to insert and extract lithium may be preferably larger than electrochemical equivalent of the cathode 21.

(Anode Material: Titanium-Containing Compound)

The anode material includes one or more of titanium-containing compounds. The kind of the titanium-containing compounds is not particularly limited; however, non-limiting examples of the titanium-containing compounds may include a titanium oxide, a lithium-titanium composite oxide, and a hydrogen-titanium compound. Since the titanium-containing compounds are electrochemically stable (have low reactivity), as compared with carbon materials, etc. to be described later, the titanium-containing compounds suppress decomposition reaction of the electrolytic solution resulting from reactivity of the anode 22.

The "titanium oxide" is a generic name of a compound of titanium (Ti) and oxygen (O). The "lithium-titanium composite oxide" is a generic name of an oxide including titanium, lithium, and one or more of other elements as constituent elements. Details of the other elements may be as described above, for example. The "hydrogen-titanium compound" is a generic name of a compound including hydrogen (H) and titanium as constituent elements. Note that the hydrogen-titanium compound described here is excluded from the foregoing lithium-titanium composite oxide.

More specifically, the titanium oxide may include, for example, a compound represented by the following formula (11). More specifically, non-limiting examples of the titanium oxide may include a bronze type titanium oxide.

$$TiO_w \tag{11}$$

where w satisfies $1.85 \leq w \leq 2.15$.

Specific but non-limiting examples of the titanium oxide may include an anatase type titanium oxide ($TiO_2$), a rutile type titanium oxide, and a brookite type titanium oxide.

Note that the titanium oxide may be a composite oxide including, together with titanium, one or more of elements such as phosphorus (P), vanadium (V), tin (Sn), copper (Cu), nickel (Ni), iron (Fe), and cobalt (Co). Specific but non-limiting examples of the composite oxide may include $TiO_2$—$P_2O_5$, $TiO_2$—$V_2O_5$, $TiO_2$—$P_2O_5$—$SnO_2$, and $TiO_2$—$P_2O_5$-MeO, where Me may be, for example, one or more of elements such as copper, nickel, iron, and cobalt.

A potential at which lithium is inserted in and extracted from these titanium oxides may be, for example, within a range from 1 V to 2 V both inclusive (vs $Li/Li^+$).

The lithium-titanium composite oxide may include, for example, one or more of respective compounds represented by the following formulas (12) to (14). More specifically, non-limiting examples of the lithium-titanium composite oxide may include a ramsdellite type lithium titanate. M1 in the formula (12) is a metal element that possibly becomes a divalent ion. M2 in the formula (13) is a metal element that possibly becomes a trivalent ion. M3 in the formula (14) is a metal element that possibly becomes a tetravalent ion.

$$Li[Li_xM1_{(1-3x)/2}Ti_{(3+x)/2}]O_4 \tag{12}$$

where M1 is one or more of magnesium (Mg), calcium (Ca), copper (Cu), zinc (Zn), and strontium (Sr), and "x" satisfies $0 \leq x \leq 1/3$.

$$Li[Li_yM2_{1-3y}Ti_{1+2y}]O_4 \tag{13}$$

where M2 is one or more of aluminum (Al), scandium (Sc), chromium (Cr), manganese (Mn), iron (Fe), germanium (Ge), gallium (Ga), and yttrium (Y), and "y" satisfies $0 \leq y \leq 1/3$.

$$Li[Li_{1/3}M3_zTi_{(5/3)-z}]O_4 \tag{14}$$

where M3 is one or more of vanadium (V), zirconium (Zr), and niobium (Nb), and "z" satisfies $0 \leq z \leq 2/3$.

The crystal structure of the lithium-titanium composite oxide is not particularly limited; however, in particular, the spinel type crystal structure may be preferable. The spinel type crystal structure is resistant to change during charge and discharge, which makes it possible to achieve stable battery characteristics.

Specific but non-limiting examples of the compound represented by the formula (12) may include $Li_{3.75}Ti_{4.875}Mg_{0.375}O_{12}$. Specific but non-limiting examples of the compound represented by the formula (13) may include $LiCrTiO_4$. Specific but non-limiting examples of the compound represented by the formula (14) may include $Li_4Ti_5O_{12}$ and $Li_4Ti_{4.95}Nb_{0.05}O_{12}$.

Specific but non-limiting examples of the hydrogen-titanium compound may include $H_2Ti_3O_7(3TiO_2.1H_2O)$, $H_6Ti_{12}O_{27}(3TiO_2.0.75H_2O)$, $H_2Ti_6O_{13}(3TiO_2.0.5H_2O)$, $H_2Ti_7O_{15}(3TiO_2.0.43H_2O)$, and $H_2Ti_{12}O_{25}(3TiO_2.0.25H_2O)$.

It goes without saying that two or more of the respective compounds represented by the formulas (12) to (14) may be used in combination. Moreover, two or more of the titanium oxide, the lithium-titanium composite oxide, and the hydrogen-titanium compound may be used in combination.

(Other Anode Materials)

It is to be noted that the anode material may include one or more of other anode materials together with the foregoing titanium-containing compound. The kind of the other anode materials is not particularly limited; however, non-liming examples of the other anode materials may include a carbon material and a metal-based material.

The "carbon material" is a generic name of a material including carbon as a constituent element. The carbon material causes an extremely-small change in a crystal structure thereof during insertion and extraction of lithium, which stably achieves high energy density. Further, the carbon material also serves as the anode conductor, which improves conductivity of the anode active material layer 22B.

Non-limiting examples of the carbon material may include graphitizable carbon, nongraphitizable carbon, and graphite. A spacing of (002) plane in the nongraphitizable carbon may be preferably 0.37 nm or larger, and a spacing of (002) plane in the graphite may be preferably 0.34 nm or smaller. More specific examples of the carbon material may include pyrolytic carbons, cokes, glassy carbon fibers, an organic polymer compound fired body, activated carbon, and carbon blacks. Non-limiting examples of the cokes may include pitch coke, needle coke, and petroleum coke. The organic polymer compound fired body is a polymer compound fired (carbonized) at an appropriate temperature. Non-limiting examples of the polymer compound may include phenol resin and furan resin. Other than the materials mentioned above, the carbon material may be low crystalline carbon that is subjected to heat treatment at a temperature of about 1000° C. or lower, or may be amorphous carbon. It is to be noted that a shape of the carbon material may be one or more of a fibrous shape, a spherical shape, a granular shape, and a scale-like shape.

The "metal-based material" is a generic name of a material including one or more of metal elements and metalloid elements as constituent elements, and the metal-based material achieves high energy density. However, the foregoing lithium-titanium composite oxide is excluded from the metal-based material described here.

The metal-based material may be any of a simple substance, an alloy, or a compound, may be two or more thereof, or may have one or more phases thereof at least in part. It is to be noted that the "alloy" also encompasses a material that includes one or more metal elements and one or more metalloid elements, in addition to a material that is configured of two or more metal elements. Further, the alloy may include one or more of nonmetallic elements. Non-limiting examples of a structure of the metal-based material may include a solid solution, a eutectic crystal (a eutectic mixture), an intermetallic compound, and a structure in which two or more thereof coexist.

The metal elements may be, for example, metal elements that are able to form an alloy with lithium, and the metalloid elements may be, for example, metalloid elements that are able to form an alloy with lithium. Specific but non-limiting examples of the metal elements and the metalloid elements may include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc, hafnium (Hf), zirconium, yttrium (Y), palladium (Pd), and platinum (Pt).

In particular, silicon, tin, or both may be preferable. Silicon and tin have superior ability to insert and extract lithium, and achieve remarkably high energy density accordingly.

A material that includes silicon, tin, or both as constituent elements may be any of a simple substance, an alloy, and a compound of silicon, may be any of a simple substance, an alloy, and a compound of tin, may be two or more thereof, or may be a material that has one or more phases thereof at least in part. The simple substance described here merely refers to a simple substance in a general sense, and may include a small amount of impurity. In other word, purity of the simple substance is not necessarily limited to 100%.

The alloy of silicon may include, for example, one or more of elements such as tin, nickel, copper, iron, cobalt, manganese, zinc, indium, silver, titanium, germanium, bismuth, antimony, and chromium, as constituent elements other than silicon. The compound of silicon may include, for example, one or more of elements such as carbon and oxygen, as constituent elements other than silicon. It is to be noted that the compound of silicon may include, for example, one or more of the elements described related to the alloy of silicon, as constituent elements other than silicon.

Specific but non-limiting examples of the alloy of silicon and the compound of silicon may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), and LiSiO. It is to be noted that "v" in $SiO_v$ may be, for example, within a range of $0.2<v<1.4$.

The alloy of tin may include, for example, one or more of elements such as silicon, nickel, copper, iron, cobalt, manganese, zinc, indium, silver, titanium, germanium, bismuth, antimony, and chromium, as constituent elements other than tin. The compound of tin may include, for example, one or more of elements such as carbon and oxygen, as constituent elements other than tin. It is to be noted that the compound of tin may include, for example, one or more of the elements described related to the alloy of tin, as constituent elements other than tin.

Specific but non-limiting examples of the alloy of tin and the compound of tin may include $SnO_w$ ($0<w\leq2$), $SnSiO_3$, LiSnO, and $Mg_2Sn$.

In particular, the material that includes tin as a constituent element may be preferably, for example, a tin-containing material that includes, together with tin as a first constituent element, a second constituent element and a third constituent element. The second constituent element may include, for example, one or more of elements such as cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, and silicon. The third constituent element may include, for example, one or more of elements such as boron, carbon, aluminum, and phosphorus. The tin-containing material including the second constituent element and the third constituent element makes it possible to achieve, for example, high battery capacity and superior cycle characteristics.

In particular, the tin-containing material may be preferably a tin-cobalt-carbon-containing material that includes tin, cobalt, and carbon as constituent elements. In the tin-cobalt-carbon-containing material, for example, a content of carbon may be from 9.9 mass % to 29.7 mass % both inclusive, and a ratio of contents of tin and cobalt (Co/(Sn+Co)) may be from 20 mass % to 70 mass % both inclusive. This makes it possible to achieve high energy density.

The tin-cobalt-carbon-containing material may have a phase that includes tin, cobalt, and carbon. Such a phase may be preferably low crystalline or amorphous. This phase is a reaction phase that is able to react with lithium. Hence, existence of the reaction phase results in achievement of superior characteristics. A half width (a diffraction angle $2\theta$) of a diffraction peak obtained by X-ray diffraction of this reaction phase may be preferably 1° or larger in a case where a CuK$\alpha$ ray is used as a specific X-ray, and an insertion rate is 1°/min. This makes it possible to insert and extract lithium more smoothly, and to decrease reactivity with the electrolytic solution. It is to be noted that, in some cases, the tin-cobalt-carbon-containing material may include a phase that includes simple substances of the respective constituent elements or part thereof in addition to the low-crystalline phase or the amorphous phase.

Comparison between X-ray diffraction charts before and after an electrochemical reaction with lithium makes it possible to easily determine whether the diffraction peak obtained by the X-ray diffraction corresponds to the reaction phase that is able to react with lithium. For example, if a position of the diffraction peak after the electrochemical reaction with lithium is changed from the position of the diffraction peak before the electrochemical reaction with lithium, the obtained diffraction peak corresponds to the reaction phase that is able to react with lithium. In this case, for example, the diffraction peak of the low-crystalline reaction phase or the amorphous reaction phase may be seen within a range of $2\theta$ that is from 20° to 50° both inclusive. Such a reaction phase may include, for example, the respective constituent elements mentioned above, and it may be considered that such a reaction phase has become low crystalline or amorphous mainly because of existence of carbon.

In the tin-cobalt-carbon-containing material, part or all of carbon that is the constituent element thereof may be preferably bound to one or both of a metal element and a metalloid element that are other constituent elements thereof. Binding part or all of carbon suppresses cohesion or crystallization of, for example, tin. It is possible to confirm a binding state of the elements, for example, by X-ray photoelectron spectroscopy (XPS). In a commercially-available apparatus, for example, an Al-K$\alpha$ ray or a Mg-K$\alpha$ ray may be used as a soft X-ray. In a case where part or all of carbon is bound to one or both of the metal element and the metalloid element, a peak of a synthetic wave of is orbit of carbon (C1s) appears in an energy region lower than 284.5 eV It is to be noted that energy calibration is so made that a peak of 4f orbit of a gold atom (Au4f) is obtained at 84.0 eV. In this case, in general, surface contamination carbon exists on the material surface. Hence, a peak of C1s of the surface contamination carbon is regarded to be at 284.8 eV, and this peak is used as energy standard. In XPS measurement, a waveform of the peak of C1s is obtained as a form that includes the peak of the surface contamination carbon and the peak of the carbon in the tin-cobalt-carbon-containing material. The two peaks may be therefore separated from each other, for example, by analysis with use of commercially-available software. In the analysis of the waveform, a position of the main peak that exists on the lowest bound energy side is regarded as the energy standard (284.8 eV).

The tin-cobalt-carbon-containing material is not limited to a material that includes only tin, cobalt, and carbon as constituent elements. The tin-cobalt-carbon-containing material may further include one or more of elements such as silicon, iron, nickel, chromium, indium, niobium, germanium, titanium, molybdenum, aluminum, phosphorus, gallium, and bismuth, as constituent elements, in addition to tin, cobalt, and carbon.

Other than the tin-cobalt-carbon-containing material, a tin-cobalt-iron-carbon-containing material that includes tin, cobalt, iron, and carbon as constituent elements may be also preferable. Any composition of the tin-cobalt-iron-carbon-containing material may be adopted. To give an example, in a case where a content of iron is set smaller, a content of carbon may be from 9.9 mass % to 29.7 mass % both inclusive, a content of iron may be from 0.3 mass % to 5.9 mass % both inclusive, and a ratio of contents of tin and cobalt (Co/(Sn+Co)) may be from 30 mass % to 70 mass % both inclusive. Alternatively, in a case where the content of iron is set larger, the content of carbon may be from 11.9 mass % to 29.7 mass % both inclusive, the ratio of contents of tin, cobalt, and iron ((Co+Fe)/(Sn+Co+Fe)) may be from 26.4 mass % to 48.5 mass % both inclusive, and the ratio of contents of cobalt and iron (Co/(Co+Fe)) may be from 9.9 mass % to 79.5 mass % both inclusive. Such composition ranges allow for achievement of high energy density. It is to be noted that physical properties (such as a half width) of the tin-cobalt-iron-carbon-containing material are similar to physical properties of the foregoing tin-cobalt-carbon-containing material.

Other than the materials mentioned above, non-limiting examples of the other anode materials may include a metal oxide and a polymer compound. Non-limiting examples of the metal oxide may include iron oxide, ruthenium oxide, and molybdenum oxide. Non-limiting examples of the polymer compound may include polyacetylene, polyaniline, and polypyrrole.

Details of the anode binder may be similar to, for example, details of the foregoing cathode binder. Moreover, details of the anode conductor may be similar to, for example, details of the foregoing cathode conductor.

The anode active material layer 22B may be formed by, for example, one or more of a coating method, a vapor-phase method, a liquid-phase method, a spraying method, and a firing method (sintering method). The coating method may be, for example, a method in which, after, for example, a particulate (powder) anode active material and an anode binder are dissolved or dispersed in a solvent to prepare a solution, and the solution is applied onto the anode current collector 22A. Non-limiting examples of the vapor-phase method may include a physical deposition method and a chemical deposition method. More specifically, non-limiting examples thereof may include a vacuum evaporation method, a sputtering method, an ion plating method, a laser ablation method, a thermal chemical vapor deposition method, a chemical vapor deposition (CVD) method, and a plasma chemical vapor deposition method. Non-limiting examples of the liquid-phase method may include an electrolytic plating method and an electroless plating method. The spraying method is a method in which an anode active material in a fused state or a semi-fused state is sprayed to the anode current collector 22A. The firing method may be, for example, a method in which, after the foregoing solution is applied onto the anode current collector 22A, the solution is subjected to heat treatment at a temperature higher than a melting point of, for example, the anode binder. Non-limiting examples of the firing method may include an atmosphere firing method, a reactive firing method, and a hot press firing method.

In the secondary battery, as described above, in order to prevent lithium metal from being unintentionally precipitated on a surface of the anode 22 in the middle of charge, the electrochemical equivalent of the anode material that has ability to insert and extract lithium may be preferably larger than the electrochemical equivalent of the cathode. In a case where an open circuit voltage (that is, a battery voltage) in a completely-charged state is 4.25 V or higher, an extraction amount of lithium per unit mass is larger than that in a case where the open circuit voltage is 4.20 V, even if the same cathode active material is used. Hence, amounts of the cathode active material and the anode active material are adjusted in accordance therewith. As a result, high energy density is achieved.

[Separator]

The separator 23 may be provided, for example, between the cathode 21 and the anode 22, as illustrated in FIG. 2. The separator 23 passes lithium ions therethrough while preventing current short circuit that results from contact between the cathode 21 and the anode 22.

More specifically, the separator 23 may include, for example, one or more of porous films such as porous films of a synthetic resin and ceramics. The separator 23 may be a laminated film in which two or more porous films are laminated. Non-limiting examples of the synthetic resin may include polytetrafluoroethylene, polypropylene, and polyethylene.

In particular, the separator 23 may include, for example, the foregoing porous film (a base layer) and a polymer compound layer provided on a single surface or both surfaces of the base layer. This makes it possible to improve adhesibility of the separator 23 with respect to each of the cathode 21 and the anode 22, thereby suppressing deformation of the spirally wound electrode body 20. This makes it possible to suppress decomposition reaction of the electrolytic solution and to suppress liquid leakage of the electrolytic solution with which the base layer is impregnated. Accordingly, even if charge and discharge are repeated, resistance is less prone to increase, and the secondary battery is less prone to swell.

The polymer compound layer may include, for example, one or more of polymer compounds such as polyvinylidene fluoride, which has high physical strength and is electrochemically stable. Note that the kind of the polymer compounds is not limited to polyvinylidene fluoride. In order to form the polymer compound layer, for example, the base layer may be coated with a solution prepared by dissolving or dispersing the polymer compound in, for example, an organic solvent, and thereafter, the base layer may be dried. Alternatively, the base layer may be immersed in the solution, and thereafter the base layer may be dried.

The polymer compound layer may include, for example, one or more of insulating particles such as inorganic particles. This causes the separator 23 to become resistant to oxidation, thereby making short circuit less prone to occur. This makes it possible to improve safety of the secondary battery. The kind of the inorganic particles may be, for example, aluminum oxide and aluminum nitride.

[Electrolytic Solution]

The spirally wound electrode body 20 may be impregnated with the electrolytic solution, as described above. In other words, for example, each of the cathode 21, the anode 22, and the separator 23 may be impregnated with the electrolytic solution.

(Dicarbonyl Compound)

The electrolytic solution may include one or more of dicarbonyl compounds. The "dicarbonyl compound" is a generic name of a cyclic or chain compound having two carbonyl groups (—C(=O)—), as described later.

Specific but non-limiting examples of the dicarbonyl compound may include respective compounds represented by the following formulas (1) to (6). In particular, a content of the dicarbonyl compound in the electrolytic solution may be from 0.01 wt % to 5 wt % both inclusive. In a case where the electrolytic solution includes two or more of dicarbonyl compounds, the content of the dicarbonyl compound described here is a total sum of contents of the two or more of the dicarbonyl compounds.

[Chem. 2]

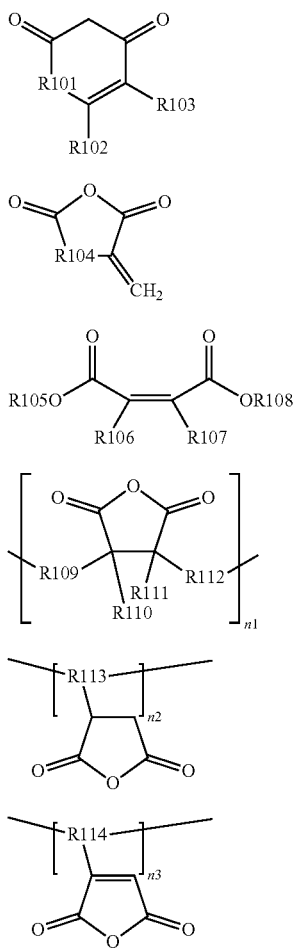

where each of R101, R104, R109, and R112 is an alkylene group, each of R102, R103, R106, R107, R110, and R111 is one of a hydrogen group, an alkyl group, a carboxyl group, and an alkylcarboxyl group, each of R105 and R108 is one of a hydrogen group, a monovalent hydrocarbon group, a silyl group (—SiR$_3$), and an alkali metal, each of R113 and R114 is a trivalent hydrocarbon group, R101 is optionally absent, and each of R109 and R112 is optionally absent, R102 and R103 are optionally bound to each other, R106 and R107 are optionally bound to each other, R110 and R111 are optionally bound to each other, each of three R's is one of a hydrogen group and a monovalent hydrocarbon group, and each of n1, n2, and n3 is an integer of 2 or more.

The electrolytic solution includes the dicarbonyl compound, which forms a coating film derived from the dicarbonyl compound on a surface of the anode 22 during charge and discharge. In particular, in a case where the anode 22 includes the titanium-containing compound as described above, the electrolytic solution includes the foregoing predetermined (appropriate) amount of the dicarbonyl compound; therefore, the surface of the anode 22 is sufficiently and stably protected by the coating film derived from the dicarbonyl compound, thereby specifically decreasing irreversible capacity during initial charge and initial discharge. Thus, high discharge capacity is obtained during the initial charge and the initial discharge, and discharge capacity is less prone to be decreased even if charge and discharge are repeated.

In order to discriminate kinds of the dicarbonyl compounds, the compound represented by the formula (1) is referred to as a "first dicarbonyl compound", the compound represented by the formula (2) is referred to as a "second dicarbonyl compound", the compound represented by the formula (3) is referred to as a "third dicarbonyl compound", the compound represented by the formula (4) is referred to as a "fourth dicarbonyl compound", the compound represented by the formula (5) is referred to as a "fifth dicarbonyl compound", and the compound represented by the formula (6) is referred to as a "sixth dicarbonyl compound".

Moreover, the first dicarbonyl compound, the second dicarbonyl compound, the third dicarbonyl compound, the fourth dicarbonyl compound, the fifth dicarbonyl compound, and the sixth dicarbonyl compound are collectively referred to as "dicarbonyl compounds" as necessary.

(First Dicarbonyl Compound)

The first dicarbonyl compound is a cyclic compound in which a ring includes a dicarboxylic anhydride bond (—C(=O)—O—C(=O)—) and a carbon-carbon double bond (—C(—R102)=C(—R103)-), as represented by the formula (1).

The kind of R101 is not particularly limited, as long as R101 is the alkylene group, as described above. Non-limiting examples of the alkylene group may include a methylene group, an ethylene group, a propylene group, and a butylene group. Accordingly, the ring in the first dicarbonyl compound may be a six-membered ring or a seven or more-membered ring. It is to be noted that the alkylene group may be a straight-chain group or a branched group having one or more side chains.

The number of carbons in the alkylene group is not particularly limited, but may be specifically preferably 1 to 6, which improves solubility, compatibility, and other properties of the first dicarbonyl compound.

Note that R101 is optionally absent. In a case where R101 is absent, two carbon atoms disposed to interpose R101 in between are bound to each other, as can be seen from the formula (1). One carbon atom of the two carbon atoms is a carbon atom forming a carbonyl group, and the other carbon atom of the two carbon atoms is a carbon atom to which R102 is bound. Accordingly, the ring in the first dicarbonyl compound is not limited to the foregoing six- or more-membered ring, and may be a five-membered ring.

The kinds of R102 and R103 are not particularly limited, as long as each of R102 and R103 is one of the hydrogen group, the alkyl group, the carboxyl group, and the alkylcarboxyl group, as described above. R102 and R103 may be groups of a same kind or groups of different kinds.

Non-limiting examples of the alkyl group may include a methyl group, an ethyl group, a propyl group, and a butyl group. It is to be noted that the alkyl group may be, for example, a straight-chain group or a branched group having one or more side chains.

The number of carbons in the alkyl group is not particularly limited, but may be specifically preferably from 1 to 6, which improves solubility, compatibility, and other properties of the first dicarbonyl compound.

The alkylcarboxyl group is a monovalent group in which an alkyl group and a carboxyl group are bound to each other. In other words, the alkylcarboxyl group is a group in which an alkylene group and a carboxyl group are bound to each other. Details of the alkylene group are as described above. Non-limiting examples of the alkylcarboxyl group may include a methylcarboxyl group, an ethylcarboxyl group, a propylcarboxyl group, and a butylcarboxyl group.

The number of carbons in a portion (the alkylene group) other than the carboxyl group in the alkylcarboxyl group is not particularly limited, but may be specifically preferably from 1 to 6, which improves solubility, compatibility, and other properties of the first dicarbonyl compound.

Note that R102 and R103 are optionally bound to each other. In this case, R102 and R103 are bound to each other to form a ring. A binding position of R103 in R102 is not particularly limited. R103 may be bound to a terminal of R102 or at a middle site of R102. Likewise, a binding position of R102 in R103 is not particularly limited. R102 may be bound to a terminal of R103 or at a middle site of R103.

(Second Dicarbonyl Compound)

The second dicarbonyl compound is a cyclic compound in which a ring includes a dicarboxylic anhydride bond and a methylene group ($=CH_2$) is bound to the ring, as represented by the formula (2).

Details of R104 such as the kind and the number of carbons are similar to the details of R101 such as the kind and the number of carbons mentioned above. Hence, the ring in the second dicarbonyl compound may be a five-membered ring or a six or more-membered ring.

(Third Dicarbonyl Compound)

The third dicarbonyl compound is a chain compound in which two carboxyl type group (—C(=O)—OR105 and —C(=O)—OR108) bound to a carbon-carbon double bond (—C(—R106)=C(—R107)-), as represented by the formula (3).

Kinds of R105 and R108 are not particularly limited, as long as each of R105 and R108 is one of the hydrogen group, the monovalent hydrocarbon group, the silyl group, and the alkali metal, as described above.

The "monovalent hydrocarbon group" is a generic name of a monovalent group of carbon and hydrogen, and may be a straight-chain group, a branched group having one or more side chains, or a cyclic group. Moreover, the monovalent hydrocarbon group may include one or more carbon-carbon unsaturated bonds, or may not include the carbon-carbon unsaturated bond. The carbon-carbon unsaturated bond may be one or both of a carbon-carbon double bond (>C=C<) and a carbon-carbon triple bond (—C≡C—).

More specifically, the monovalent hydrocarbon group may be, for example, one of an alkyl group, an alkenyl group, an alkynyl group, a cycloalkyl group, an aryl group, and a binding group, which facilitates formation of a sufficiently strong coating film on the surface of the anode 22. The binding group may be a monovalent group in which two or more of the alkyl group, the alkenyl group, the alkynyl group, the cycloalkyl group, and the aryl group are bound to each other.

The kind of the alkyl group is not particularly limited; however, non-limiting examples of the alkyl group may include a methyl group, an ethyl group, a propyl group, a butyl group, a pentyl group, a hexyl group, a heptyl group, an octyl group, a nonyl group, and a decyl group. The kind of the alkenyl group is not particularly limited; however, non-limiting examples of the alkenyl group may include an ethenyl group, a propenyl group, a butenyl group, a pentenyl group, a hexenyl group, a heptenyl group, an octenyl group, a nonenyl group, and a decenyl group. The kind of the alkynyl group is not particularly limited; however, non-limiting examples of the alkynyl group may include an ethynyl group, a propynyl group, a butynyl group, a pentynyl group, a hexynyl group, a heptynyl group, an octynyl group, a nonynyl group, and a decynyl group. The kind of the cycloalkyl group is not particularly limited; however, non-limiting examples of the cycloalkyl group may include a cyclopropyl group, a cyclobutyl group, a cyclopentyl group, a cyclohexyl group, and a cyclodecyl group. The kind of the aryl group is not particularly limited; however, non-limiting examples of the aryl group may include a phenyl group and a naphthyl group.

The kind of the binding group is not particularly limited, as long as the binding group is a monovalent group in which two or more of the alkyl group, the alkenyl group, the alkynyl group, the cycloalkyl group, and the aryl group are bound to each other.

The number of carbons in the alkyl group is not particularly limited, but may be specifically preferably from 1 to 6. The number of carbons in each of the alkenyl group and the alkynyl group is not particularly limited, but may be specifically preferably from 2 to 6. The number of carbons in each of the cycloalkyl group and the aryl group is not particularly limited, but may be specifically preferably from 6 to 18. This improves solubility, compatibility, and other properties of the third dicarbonyl compound.

Details of three R's included in the silyl group (such as the monovalent hydrocarbon group and the number of carbons) are as described above. The three R's may be groups of a same kind or groups of different kinds. It goes without saying that only two of the three R's may be groups of a same kind.

The alkali metal is an element belonging to Group 1 in the long form of the periodic table of the elements. Specific but non-limiting examples of the alkali metal may include lithium (Li), sodium (Na), potassium (K), rubidium (Rb), cesium (Cs), and francium (Fr).

Details of R106 and R107 such as the kind and the number of carbons are similar to the details of R102 such as the kind and the number of carbons mentioned above.

Note that R106 and R107 are optionally bound to each other. In this case, R106 and R107 are bound to each other to form a ring. Details of each of a binding position in R106 and a binding position in R107 are similar to the details of the binding position in R102 mentioned above.

The third dicarbonyl compound described here includes geometric isomers. In other words, the third dicarbonyl compound may be a cis-isomer or a trans-isomer.

(Fourth Dicarbonyl Compound)

The fourth dicarbonyl compound is a polymer compound including a repeating unit, as represented by the formula (4), and the repeating unit includes a five-membered ring (succinic anhydride) having a dicarboxylic anhydride bond.

Details of each of R109 and R112 such as the kind and the number of carbons are similar to the details of R101 such as the kind and the number of carbons mentioned above. Moreover, details of each of R110 and R111 such as the kind and the number of carbons are similar to the details of R102 such as the kind and the number of carbons mentioned above.

Note that R110 and R111 are optionally bound to each other. In this case, R110 and R111 are bound to each other to form a ring. Details of each of a binding position in R110 and a binding position in R111 are similar to the details of the binding position in R102 mentioned above.

The value of n1 is not particularly limited, as long as n1 is an integer of 2 or more. More specifically, a weight-average molecular weight of the fourth dicarbonyl compound is not particularly limited, but may be specifically preferably from 1000 to 5000000 both inclusive, which facilitates formation of a stronger coating film on the surface of the anode 22.

(Fifth Dicarbonyl Compound)

The fifth dicarbonyl compound is a polymer compound including a repeating unit, as represented by the formula (5), and the repeating unit includes a five-membered ring (succinic anhydride) having a dicarboxylic anhydride bond.

The kind of R113 is not particularly limited, as long as R113 is a trivalent hydrocarbon group, as described above. The trivalent hydrocarbon group is a generic name of a trivalent group of carbon and hydrogen, and may be a straight-chain group, a branched group having one or more side chains, or a cyclic group. Moreover, the trivalent hydrocarbon group may include one or more carbon-carbon unsaturated bonds, or may not include the carbon-carbon unsaturated bond. The carbon-carbon unsaturated bond may be one or both of a carbon-carbon double bond (>C=C<) and a carbon-carbon triple bond (—C≡C—).

Specifically, the trivalent hydrocarbon group may be, for example, a group in which three hydrogen groups are eliminated from one of alkane, alkene, alkyne, alicyclic hydrocarbon, aromatic hydrocarbon, and a binding compound, which facilitates formation of a sufficiently strong coating film on the surface of the anode 22. The binding compound is a compound in which two or more of alkane, alkene, alkyne, alicyclic hydrocarbon, and aromatic hydrocarbon are bound to each other. It is to be noted that a position where the hydrogen groups are eliminated is not particularly limited.

The kind of alkane is not particularly limited; however, non-limiting examples of alkane may include methane, ethane, propane, butane, pentane, hexane, heptane, octane, nonane, and decane. The kind of alkene is not particularly limited; however, non-limiting examples of alkene may include ethylene (ethene), propene (propylene), butene, pentene, hexene, heptene, octene, nonene, and decene. The kind of alkyne is not particularly limited; however, non-limiting examples of alkyne may include ethyne (acetylene), propyne, butyne, penthyne, hexyne, heptyne, octyne, nonyne, and decyne. The kind of alicyclic hydrocarbon is not particularly limited; however, non-limiting examples of alicyclic hydrocarbon may include cyclopropane, cyclobutane, cyclopentane, cyclohexane, cycloheptane, cyclooctane, cyclononane, and cyclodecane. The kind of aromatic hydrocarbon is not particularly limited; however, non-limiting examples of aromatic hydrocarbon may include benzene, naphthalene, anthracene, biphenyl, and terphenyl.

The kind of the binding compound is not particularly limited, as long as the binding compound is a group in which three hydrogen groups are eliminated from a compound in which two or more of alkane, alkene, alkyne, alicyclic hydrocarbon, and aromatic hydrocarbon are bound to each other.

It is to be noted that R113 may include one or more repeating units, as long as R113 is the trivalent hydrocarbon group as a whole. The repeating unit described here may be, for example, a divalent hydrocarbon group, and details of the divalent hydrocarbon group is similar to the details of the trivalent hydrocarbon group mentioned above, except that the divalent hydrocarbon group is a group in which two hydrogen groups in place of three hydrogen groups are eliminated.

Details of n2 are similar to the details of n1 mentioned above. In other words, a weight-average molecular weight of the fifth dicarbonyl compound is not particularly limited, but may be specifically preferably from 1000 to 5000000 both inclusive, which facilitates formation of a stronger coating film on the surface of the anode 22.

(Sixth Dicarbonyl Compound)

The sixth dicarbonyl compound is a polymer compound including a repeating unit, as represented by the formula (6), and the repeating unit includes a five-membered ring (maleic anhydride) having a dicarboxylic anhydride bond.

Details of R114 are similar to the details of R113 mentioned above.

Details of n3 is similar to the details of n1 mentioned above. In other words, a weight-average molecular weight of the sixth dicarbonyl compound is not particularly limited, but may be specifically preferably from 1000 to 5000000 both inclusive, which facilitates formation of a stronger coating film on the surface of the anode 22.

(Preferable Dicarbonyl Compounds)

In particular, the dicarbonyl compounds may be preferably compounds to be described below.

(Preferable First Dicarbonyl Compound)

The first dicarbonyl compound may be preferably one or both of respective compounds represented by the following formulas (7) and (8), which facilitates formation of a stronger coating film on the surface of the anode 22.

[Chem. 3]

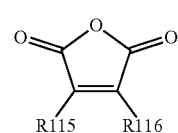

(7)

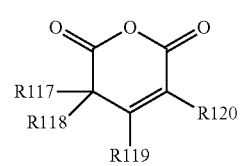

(8)

where each of R115, R116, R117, R118, R119, and R120 is one of a hydrogen group, an alkyl group, a carboxyl group, and an alkylcarboxyl group, R115 and R116 are optionally bound to each other, and any two of R117 to R120 are optionally bound to each other.

The compound represented by the formula (7) is a compound including a five-membered ring. Details of each of R115 and R116 are similar to the details of each of R102 and R103 mentioned above. Accordingly, R115 and R116 are optionally bound to each other.

The compound represented by the formula (8) is a compound including a six-membered ring. Details of each of R117 to R120 are similar to the details of each of R102 and R103 mentioned above. Accordingly, any two of R117 to R120 are optionally bound to each other.

(Preferable Second Dicarbonyl Compound)

The second dicarbonyl compound may be preferably a compound represented by the following formula (9), which facilitates formation of a stronger coating film on the surface of the anode 22.

[Chem. 4]

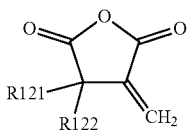
(9)

where each of R121 and R122 is one of a hydrogen group, an alkyl group, a carboxyl group, and an alkylcarboxyl group, and R121 and R122 are optionally bound to each other.

The compound represented by the formula (9) is a compound including a five-membered ring. Details of each of R121 and R122 are similar to the details of each of R102 and R103 mentioned above. Accordingly, R121 and R122 are optionally bound to each other.

(Preferable Fourth Dicarbonyl Compound)

The fourth dicarbonyl compound is a compound represented by the following formula (10), which facilitates formation of a stronger coating film on the surface of the anode 22.

[Chem. 5]

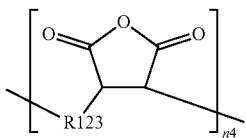
(10)

where R123 is an alkylene group, and n4 is an integer of 2 or more.

Details of R123 are similar to the details of R109 mentioned above, and details of n3 is similar to the details of n1 mentioned above.

(Specific Examples of Dicarbonyl Compounds)

Specific but non-limiting examples of the first dicarbonyl compound may include respective compounds represented by the following formulas (1-1) to (1-6). Specific but non-limiting examples of the second dicarbonyl compound may include a compound represented by the following formula (1-7). Specific but non-limiting examples of the third dicarbonyl compound may include respective compounds represented by the following formulas (1-8) to (1-13). Specific but non-limiting examples of the fourth dicarbonyl compound may include a compound represented by the following formula (1-14). Specific but non-limiting examples of the fifth dicarbonyl compound may include a compound represented by the following formula (1-15). Specific but non-limiting examples of the sixth dicarbonyl compound may include a compound represented by the following formula (1-16). The compound represented by the formula (1-14) is PEMA (poly(ethylene-alt-maleic anhydride). It is to be noted that details of each of n5 to n1 are similar to the details of n1 mentioned above.

[Chem. 6]

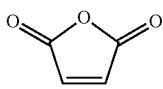
(1-1)

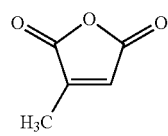
(1-2)

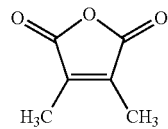
(1-3)

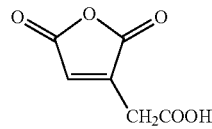
(1-4)

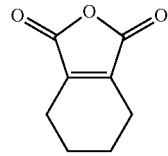
(1-5)

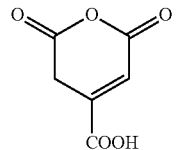
(1-6)

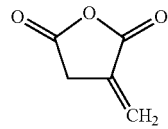
(1-7)

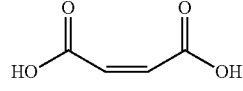
(1-8)

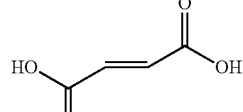
(1-9)

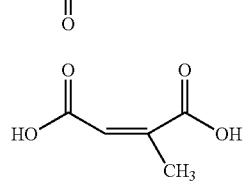
(1-10)

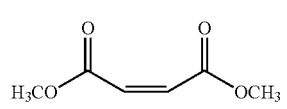
(1-11)

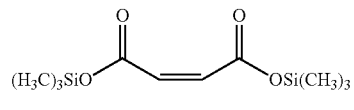
(1-12)

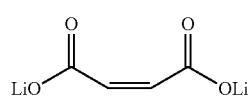
(1-13)

-continued

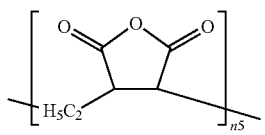

(1-14)

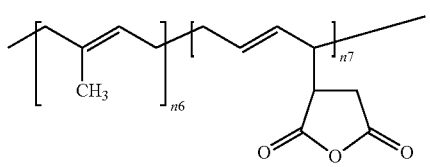

(1-15)

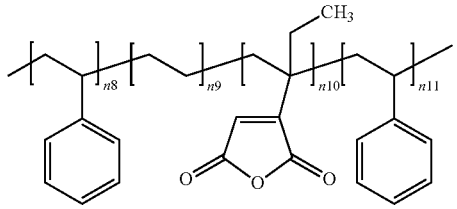

(1-16)

where each of n5, n6, n7, n8, n9, n10, and n1 is an integer of 2 or more.

In particular, the fourth dicarbonyl compound, the fifth dicarbonyl compound, and the sixth dicarbonyl compound out of the first dicarbonyl compound, the second dicarbonyl compound, the third dicarbonyl compound, the fourth dicarbonyl compound, the fifth dicarbonyl compound, and the sixth dicarbonyl compound may be preferable. Since a coating film including a polymer compound is formed on the surface of the anode 22, the fourth dicarbonyl compound, the fifth dicarbonyl compound, and the sixth dicarbonyl compound remarkably enhance strength of the coating film.

(Other Materials)

It is to be noted that the electrolytic solution may include one or more of other materials together with the foregoing dicarbonyl compounds. The kind of the other materials is not particularly limited; however, non-limiting examples of the other materials may include a solvent and an electrolyte salt.

(Solvent)

The solvent may include, for example, one or more of nonaqueous solvents (organic solvents). An electrolytic solution including the nonaqueous solvent is a so-called nonaqueous electrolytic solution.

Non-limiting examples of the nonaqueous solvent may include a cyclic carbonate ester, a chain carbonate ester, a lactone, a chain carboxylate ester, and a nitrile (mononitrile), which make it possible to achieve, for example, high battery capacity, superior cycle characteristics, and superior storage characteristics.

Specific but non-limiting examples of the cyclic carbonate ester may include ethylene carbonate, propylene carbonate, and butylene carbonate. Specific but non-limiting examples of the chain carbonate ester may include dimethyl carbonate, diethyl carbonate, ethyl methyl carbonate, and methylpropyl carbonate. Specific but non-limiting examples of the lactone may include γ-butyrolactone and γ-valerolactone. Specific but non-limiting examples of the chain carboxylate ester may include methyl acetate, ethyl acetate, methyl propionate, ethyl propionate, propyl propionate, methyl butyrate, methyl isobutyrate, methyl trimethylacetate, and ethyl trimethylacetate. Specific but non-limiting examples of the nitrile may include acetonitrile, methoxyacetonitrile, and 3-methoxypropionitrile.

Other than the materials mentioned above, non-limiting examples of the nonaqueous solvent may include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethylsulfoxide. These solvents make it possible to achieve similar advantages.

In particular, the nonaqueous solvent may preferably include one or more of ethylene carbonate, propylene carbonate, dimethyl carbonate, diethyl carbonate, and ethyl methyl carbonate. These materials make it possible to achieve, for example, high battery capacity, superior cycle characteristics, and superior storage characteristics.

In this case, a combination of a high-viscosity (high dielectric constant) solvent (having, for example, specific dielectric constant $\varepsilon \geq 30$) such as ethylene carbonate and propylene carbonate and a low-viscosity solvent (having, for example, viscosity≤1 mPa·s) such as dimethyl carbonate, ethylmethyl carbonate, and diethyl carbonate may be more preferable. The combination allows for an improvement in the dissociation property of the electrolyte salt and ion mobility.

Moreover, non-limiting examples of the nonaqueous solvent may include unsaturated cyclic carbonate ester, a halogenated carbonate ester, a sulfonate ester, an acid anhydride, a dinitrile compound, a diisocyanate compound, and a phosphate ester, which make it possible to further improve chemical stability of the electrolytic solution.

The "unsaturated cyclic carbonate ester" is a generic name of a cyclic carbonate ester having one or more unsaturated carbon-carbon bonds (carbon-carbon double bonds). Specific but non-limiting examples of the unsaturated cyclic carbonate ester may include respective compounds represented by the following formulas (11) to (13). A content of the unsaturated cyclic carbonate ester in the nonaqueous solvent is not particularly limited, but may be, for example, from 0.01 wt % to 10 wt % both inclusive.

[Chem. 7]

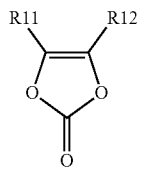

(11)

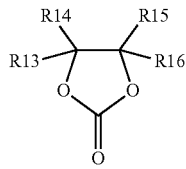

(12)

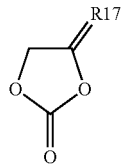

(13)

where each of R11 and R12 is one of a hydrogen group and an alkyl group, each of R13 to R16 is one of a hydrogen group, an alkyl group, a vinyl group, and an allyl group, one or more of R13 to R16 are one of the vinyl group and the allyl group, R17 is a group represented by >CR171R172, and each of R171 and R172 is one of a hydrogen group and an alkyl group.

The compound represented by the formula (11) is a vinylene carbonate-based compound. Each of R11 and R12 is not particularly limited, as long as each of R11 and R12 is one of the hydrogen group and the alkyl group, as described above. The number of carbons in the alkyl group is not particularly limited. Specific but non-limiting examples of the alkyl group may include a methyl group, an ethyl group, and a propyl group. R11 and R12 may be groups of a same kind or groups of different kinds. R11 and R12 may be bound to each other.

Specific but non-limiting examples of the vinylene carbonate-based compound may include vinylene carbonate (1,3-dioxol-2-one), methylvinylene carbonate (4-methyl-1,3-dioxol-2-one), ethylvinylene carbonate (4-ethyl-1,3-dioxol-2-one), 4,5-dimethyl-1,3-dioxol-2-one, and 4,5-diethyl-1,3-dioxol-2-one.

The compound represented by the formula (12) is a vinyl ethylene carbonate-based compound. Each of R13 to R16 is not particularly limited, as long as each of R13 to R16 is one of the hydrogen group, the alkyl group, the vinyl group, and the allyl group, as described above, on condition that one or more of R13 to R16 are one of the vinyl group and the allyl group. Details of the alkyl group are as described above. It is to be noted that R13 to R16 may be groups of a same kind or groups of different kinds. It goes without saying that some of R13 to R16 may be groups of a same kind. Two or more of R13 to R16 may be bound to each other.

Specific but non-limiting examples of the vinyl ethylene carbonate-based compound may include vinyl ethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, and 4,5-divinyl-1,3-dioxolane-2-one.

The compound represented by the formula (13) is a methylene ethylene carbonate-based compound. Each of R171 and R172 is not particularly limited, as long as each of R171 and R172 is one of the hydrogen group and the alkyl group, as described above. It is to be noted that R171 and R172 may be groups of a same kind or groups of different kinds. R171 and R172 may be bound to each other.

Specific but non-limiting examples of the methylene ethylene carbonate-based compound may include methylene ethylene carbonate (4-methylene-1,3-dioxolane-2-one), 4,4-dimethyl-5-methylene-1,3-dioxolane-2-one, and 4,4-diethyl-5-methylene-1,3-dioxolane-2-one.

In addition, non-limiting examples of the unsaturated cyclic carbonate ester may include a catechol carbonate having a benzene ring.

The "halogenated carbonate ester" is a generic name of a cyclic or chain carbonate ester including one or more halogen elements as constituent elements. Specific but non-limiting examples of the halogenated carbonate ester may include respective compounds represented by the following formulas (14) and (15). A content of the halogenated carbonate ester in the nonaqueous solvent is not particularly limited, but may be, for example, from 0.01 wt % to 10 wt % both inclusive.

[Chem. 8]

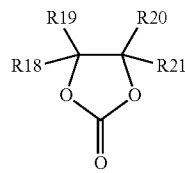

(14)

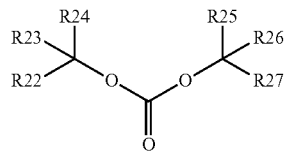

(15)

where each of R18 to R21 is one of a hydrogen group, a halogen group, an alkyl group, and a halogenated alkyl group, one or more of R18 to R21 are one of the halogen group and the halogenated alkyl group, each of R22 to R27 is one of a hydrogen group, a halogen group, an alkyl group, and a halogenated alkyl group, and one or more of R22 to R27 are one of the halogen group and the halogenated alkyl group.

The compound represented by the formula (14) is a halogenated cyclic carbonate ester. Each of R18 to R21 is not particularly limited, as long as each of R18 to R21 is one of the hydrogen group, the halogen group, the alkyl group, and the halogenated alkyl group, as described above, under a condition that one or more of R18 to R21 is one of the halogen group and the halogenated alkyl group. It is to be noted that R18 to R21 may be groups of a same kind or groups of different kinds. It goes without saying that some of R18 to R21 may be groups of a same kind. Two or more of R18 to R21 may be bound to each other.

Non-limiting examples of the halogen group may include a fluorine group, a chlorine group, a bromine group, and a iodine group, and the fluorine group may be particularly preferable. The number of the halogen groups may be one or more, and one or more kinds of the halogen groups may be adapted. Details of the alkyl group are as described above. The "halogenated alkyl group" is a generic name of a group in which one or more hydrogen groups in an alkyl group are substituted (halogenated) by a halogen group, and details of the halogen group are as described above.

Specific but non-limiting examples of the halogenated cyclic carbonate ester may include respective compounds represented by the following formulas (14-1) to (14-21), which include geometric isomers. In particular, for example, 4-fluoro-1,3-dioxolane-2-one represented by the formula (14-1) and 4,5-difluoro-1,3-dioxolane-2-one represented by the formula (14-3) may be preferable.

[Chem. 9]

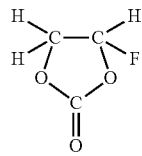

(14-1)

-continued
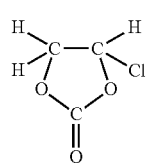 (14-2)
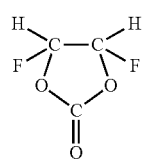 (14-3)
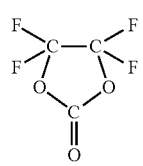 (14-4)
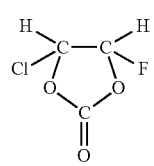 (14-5)
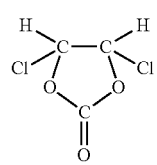 (14-6)
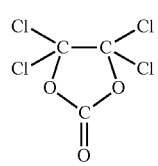 (14-7)
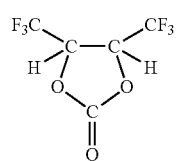 (14-8)
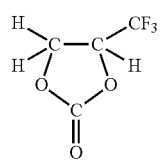 (14-9)
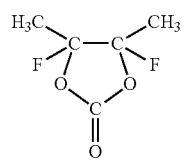 (14-10)
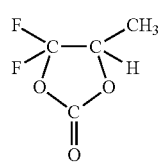 (14-11)
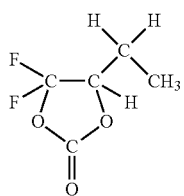 (14-12)
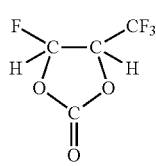 (14-13)
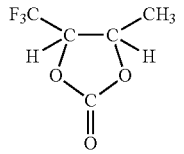 (14-14)
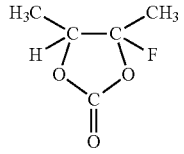 (14-15)
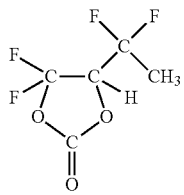 (14-16)
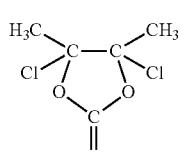 (14-17)
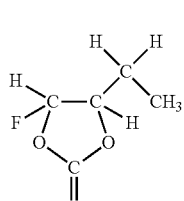 (14-18)
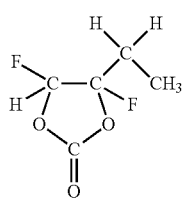 (14-19)

-continued

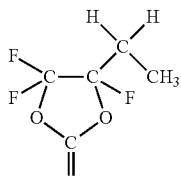
(14-20)

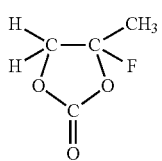
(14-21)

The compound represented by the formula (15) is a halogenated chain carbonate ester. Each of R22 to R27 is not particularly limited, as long as each of R22 to R27 is one of the hydrogen group, the halogen group, the alkyl group, and the halogenated alkyl group, as described above, under a condition that one or more of R22 to R27 is one of the halogen group and the halogenated alkyl group. Details of the halogen group, the alkyl group, and the halogenated alkyl group are as described above. It is to be noted that R22 to R27 may be groups of a same kind or groups of different kinds. It goes without saying that some of R22 to R27 may be groups of a same kind. Two or more of R22 to R27 may be bound to each other.

Specific but non-limiting examples of the halogenated chain carbonate ester may include fluoromethyl methyl carbonate, bis(fluoromethyl) carbonate, and difluoromethyl methyl carbonate.

Non-limiting examples of the sulfonate ester may include a monosulfonate ester and a disulfonate ester. A content of the sulfonate ester in the nonaqueous solvent is not particularly limited, but may be, for example, from 0.01 wt % to 10 wt % both inclusive.

The monosulfonate ester may be a cyclic monosulfonate ester or a chain monosulfonate ester. Specific but non-limiting examples of the cyclic monosulfonate ester may include sultone such as 1,3-propane sultone and 1,3-propene sultone. Specific but non-limiting examples of the chain monosulfonate ester may include a compound in which a cyclic monosulfonate ester is cleaved at a middle site.

The disulfonate ester may be a cyclic disulfonate ester or a chain disulfonate ester. Specific but non-limiting examples of the cyclic disulfonate ester may include respective compounds represented by formulas (16-1) to (16-3). Specific but non-limiting examples of the chain disulfonate ester may include a compound in which a cyclic disulfonate ester is cleaved at a middle site.

[Chem. 10]

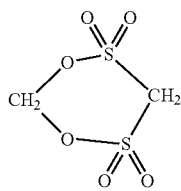
(16-1)

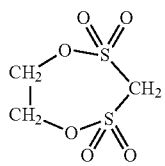
(16-2)

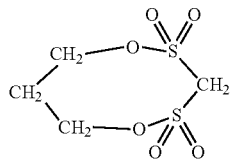
(16-3)

Non-limiting examples of the acid anhydride may include a carboxylic anhydride, a disulfonic anhydride, and a carboxylic-sulfonic anhydride. A content of the acid anhydride in the nonaqueous solvent is not particularly limited, but may be, for example, from 0.01 wt % to 10 wt % both inclusive.

Specific but non-limiting examples of the carboxylic anhydride may include succinic anhydride, glutaric anhydride, and maleic anhydride. Specific but non-limiting examples of the disulfonic anhydride may include ethanedisulfonic anhydride and propanedisulfonic anhydride. Specific but non-limiting examples of a carboxylic-sulfonic anhydride may include sulfobenzoic anhydride, sulfopropionic anhydride, and sulfobutyric anhydride.

Specific but non-limiting examples of the dinitrile compound may include a compound represented by NC—R28-CN, where R28 is one of an alkylene group and an arylene group. A content of the dinitrile compound in the nonaqueous solvent is not particularly limited, but may be, for example, from 0.5 wt % to 5 wt % both inclusive.

Non-limiting examples of the alkylene group may include a methylene group, an ethylene group, and a propylene group, and non-limiting examples of the arylene group may include a phenylene group and a naphthylene group. The number of carbons in the alkylene group is not particularly limited, but may be, for example, from 1 to 18, and the number of carbons in the arylene group is not particularly limited, but may be, for example, from 6 to 18.

Specific but non-limiting examples of the dinitrile compound may include succinonitrile (NC—$C_2H_4$—CN), glutaronitrile (NC—$C_3H_6$—CN), adiponitrile (NC—$C_4H_8$—CN), sebaconitrile (NC—$C_8H_{10}$—CN), and phthalonitrile (NC—$C_6H_4$—CN).

Non-limiting examples of the diisocyanate compound may include a compound represented by OCN—R29-NCO, where R29 is one of an alkylene group and an arylene group. Details of each of the alkylene group and the arylene group may be, for example, as described above. A content of the diisocyanate compound in the nonaqueous solvent is not particularly limited, but may be, for example, from 0.1 wt % to 10 wt % both inclusive. Specific but non-limiting examples of the diisocyanate compound may include OCN—$C_6H_{12}$—NCO.

Specific but non-limiting examples of the phosphate ester may include trimethyl phosphate, triethyl phosphate, and trialllyl phosphate. It is to be noted that a content of the phosphate ester in the nonaqueous solvent is not particularly limited, but may be, for example, from 0.5 wt % to 5 wt % both inclusive.

(Electrolyte Salt)

The electrolyte salt may include, for example, one or more of lithium salts. However, the electrolyte salt may include a salt other than the lithium salt. Non-limiting examples of the salt other than lithium may include a salt of a light metal other than lithium.

Specific but non-limiting examples of the lithium salt may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr).

In particular, one or more of lithium hexafluorophosphate, lithium tetrafluoroborate, lithium perchlorate, and lithium hexafluoroarsenate may be preferable, and lithium hexafluorophosphate may be more preferable. These lithium salts make it possible to decrease internal resistance.

Moreover, non-limiting examples of the electrolyte salt may include respective compounds represented by the following formulas (17) to (19). It is to be noted that R41 and R43 may be groups of a same kind or groups of different kinds. R51 to R53 may be groups of a same kind or groups of different kinds. It goes without saying that some of R51 to R53 may be groups of a same kind. R61 and R62 may be groups of a same kind or groups of different kinds.

[Chem. 11]

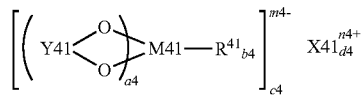

(17)

where X41 is one of Group 1 elements and Group 2 elements in the long form of the periodic table of the elements and aluminum (Al), M41 is one of transition metals, and Group 13 elements, Group 14 elements, and Group 15 elements in the long form of the periodic table of the elements, R41 is a halogen group, Y41 is one of —C(=O)—R42-C(=O)—, —C(=O)—CR43$_2$-, and —C(=O)—C(=O)—, R42 is one of an alkylene group, a halogenated alkylene group, an arylene group, and a halogenated arylene group, R43 is one of an alkyl group, a halogenated alkyl group, an aryl group, and a halogenated aryl group, a4 is an integer of 1 to 4, b4 is an integer of 0, 2, or 4, and each of c4, d4, m4, and n4 is an integer of 1 to 3.

[Chem. 12]

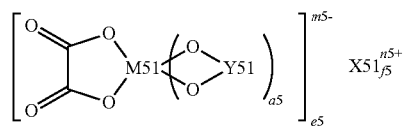

(18)

where X51 is one of Group 1 elements and Group 2 elements in the long form of the periodic table of the elements, M51 is one of transition metals, and Group 13 elements, Group 14 elements, and Group 15 elements in the long form of the periodic table of the elements, Y51 is one of —C(=O)—(CR51$_2$)$_{b5}$-C(=O)—, —R53$_2$C—(CR52$_2$)$_{c5}$-C(=O)—, —R53$_2$C—(CR52$_2$)$_{c5}$-CR53$_2$-, —R53$_2$C—(CR52$_2$)$_{c5}$-S(=O)$_2$—, —S(=O)$_2$—(CR52$_2$)$_{d5}$-S(=O)$_2$—, and —C(=O)—(CR52$_2$)$_{d5}$-S(=O)$_2$—, each of R51 and R53 is one of a hydrogen group, an alkyl group, a halogen group, and a halogenated alkyl group, one or more of R51's are one of the halogen group and the halogenated alkyl group, one or more of R53's are one of the halogen group and the halogenated alkyl group, R52 is one of a hydrogen group, an alkyl group, a halogen group, and a halogenated alkyl group, each of a5, e5, and n5 is an integer of 1 or 2, each of b5 and d5 is an integer of 1 to 4, c5 is an integer of 0 to 4, and each of f5 and m5 is an integer of 1 to 3.

[Chem. 13]

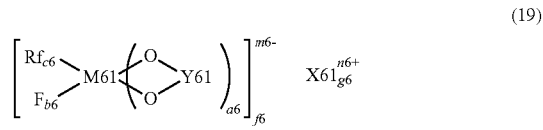

(19)

where X61 is one of Group 1 elements and Group 2 elements in the long form of the periodic table of the elements, M61 is one of transition metals, and Group 13 elements, Group 14 elements, and Group 15 elements in the long form of the periodic table of the elements, Rf is one of a fluorinated alkyl group and a fluorinated aryl group, the number of carbons in each of the fluorinated alkyl group and the fluorinated aryl group is from 1 to 10, Y61 is one of —C(=O)—(CR61$_2$)$_{d6}$-C(=O)—, —R62$_2$C—(CR61$_2$)$_{d6}$-C(=O)—, —R62$_2$C—(CR61$_2$)$_{d6}$-CR62$_2$-, —R62$_2$C—(CR61$_2$)$_{d6}$-S(=O)$_2$-, —S(=O)$_2$—(CR61$_2$)$_{e6}$-S(=O)$_2$-, and —C(=O)—(CR61$_2$)$_{e6}$-S(=O)$_2$—, R61 is one of a hydrogen group, an alkyl group, a halogen group, and a halogenated alkyl group, R62 is one of a hydrogen group, an alkyl group, a halogen group, and a halogenated alkyl group, one or more of R62's are one of the halogen group and the halogenated alkyl group, each of a6, f6, and n6 is an integer of 1 or 2, each of b6, c6, and e6 is an integer of 1 to 4, d6 is an integer of 0 to 4, and each of g6 and m6 is an integer of 1 to 3.

It is to be noted that the Group 1 elements include hydrogen (H), lithium (Li), sodium (Na), potassium (K), rubidium (Rb), cesium (Cs), and francium (Fr). The Group 2 elements include beryllium (Be), magnesium (Mg), calcium (Ca), strontium (Sr), barium (Ba), and radium (Ra). The Group 13 elements include boron (B), aluminum (Al), gallium (Ga), indium (In), and thallium (Tl). The Group 14 elements include carbon (C), silicon (Si), germanium (Ge), tin (Sn), and lead (Pb). The Group 15 elements include nitrogen (N), phosphorus (P), arsenic (As), antimony (Sb), and bismuth (Bi).

Specific but non-limiting examples of the compound represented by the formula (17) may include respective compounds represented by the following formulas (17-1) to (17-6). Specific but non-limiting examples of the compound represented by the formula (18) may include respective compounds represented by the following formulas (18-1) to (18-8). Specific but non-limiting examples of the compound represented by the formula (19) may include a compound represented by the following formula (19-1).

[Chem. 14]

(17-1) 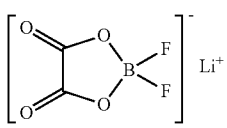

(17-2) 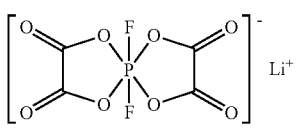

(17-3) 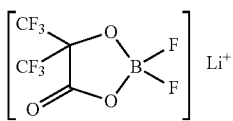

(17-4) 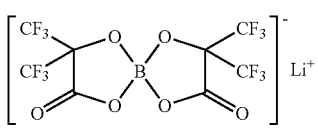

(17-5) 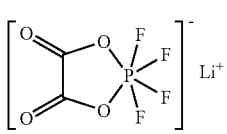

(17-6) 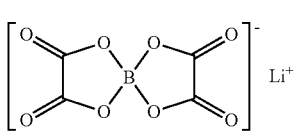

[Chem. 15]

(18-1) 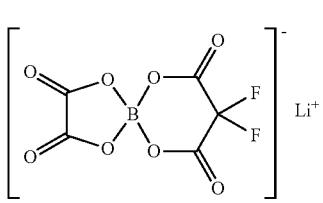

(18-2) 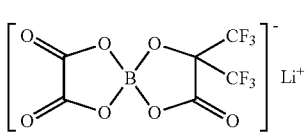

(18-3) 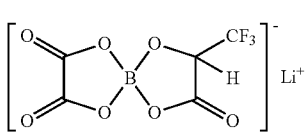

(18-4) 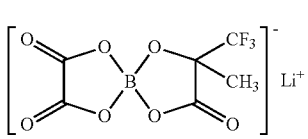

(18-5) 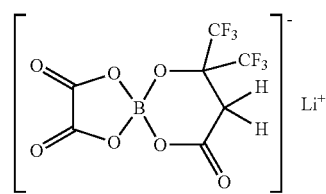

(18-6) 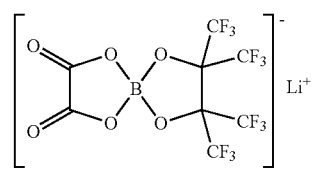

(18-7) 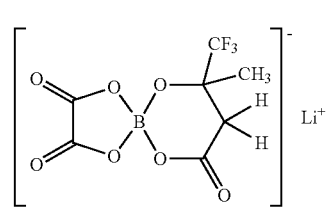

(18-8) 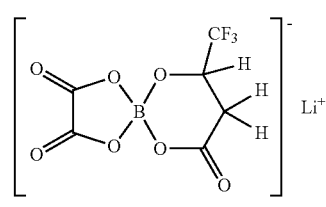

[Chem. 16]

(19-1) 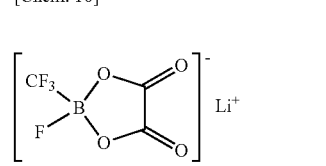

Moreover, the electrolyte salt may be, for example, respective compounds represented by the following formulas (20) to (22). Values of m and n may be the same as or different from each other. Values of p, q, and r may be the same as or different from one another. It goes without saying that the values of two of p, q, and r may be the same as each other.

$$\text{LiN}(C_mF_{2m+1}SO_2)(C_nF_{2n+1}SO_2) \tag{20}$$

where each of m and n is an integer of 1 or more.

[Chem. 17]

(21) 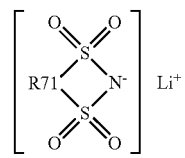

where R71 is a straight-chain perfluoroalkylene group having 2 to 4 carbons or a branched perfluoroalkylene group having 2 to 4 carbons.

$$\text{LiN}(C_pF_{2p+1}SO_2)(C_qF_{2q+1}SO_2)(C_rF_{2r+1}SO_2) \tag{22}$$

where each of p, q, and r is an integer of 1 or more.

The compound represented by the formula (20) is a chain amide compound. Specific but non-limiting examples of the chain amide compound may include lithium bis(fluorosulfonyl)amide ($LiN(SO_2F)_2$), lithium bis(trifluoromethanesulfonyl)amide ($LiN(CF_3SO_2)_2$), lithium bis(pentafluoroethanesulfonyl)amide ($LiN(C_2F_5SO_2)_2$), lithium (trifluoromethanesulfonyl)(pentafluoroethanesulfonyl)amide ($LiN(CF_3SO_2)(C_2F_5SO_2)$), lithium (trifluoromethanesulfonyl)(heptafluoropropanesulfonyl)amide ($LiN(CF_3SO_2)(C_3F_7SO_2)$), and lithium (trifluoromethanesulfonyl)(nonafluorobutanesulfonyl)amide ($LiN(CF_3SO_2)(C_4F_9SO_2)$).

The compound represented by the formula (21) is a cyclic amide compound. Specific but non-limiting examples of the cyclic amide compound may include respective compounds represented by the following formulas (21-1) to (21-4).

[Chem. 18]

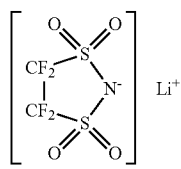
(21-1)

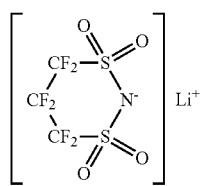
(21-2)

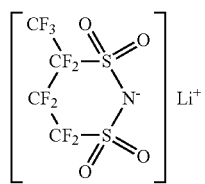
(21-3)

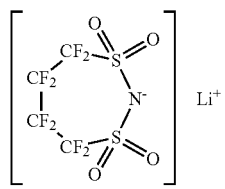
(21-4)

The compound represented by the formula (22) is a chain methide compound. Specific but non-limiting examples of the chain methide compound may include lithium tris(trifluoromethanesulfonyl)methide ($LiC(CF_3SO_2)_3$).

Moreover, the electrolyte salt may be a phosphorus-fluorine-containing salt such as lithium difluorophosphate ($LiPF_2O_2$) and lithium fluorophosphate ($Li_2PFO_3$).

It is to be noted that a content of the electrolyte salt is not particularly limited; however, in particular, the content of the electrolyte salt may be preferably from 0.3 mol/kg to 3.0 mol/kg both inclusive with respect to the solvent. This makes it possible to achieve high ionic conductivity.

<1-2. Operation>

Next, description is given of operation of the secondary battery. The secondary battery may operate as follows, for example.

When the secondary battery is charged, lithium ions are extracted from the cathode 21, and the extracted lithium ions are inserted in the anode 22 through the electrolytic solution. In contrast, when the secondary battery is discharged, lithium ions are extracted from the anode 22, and the extracted lithium ions are inserted in the cathode 21 through the electrolytic solution.

<1-3. Manufacturing Method>

Next, description is given of a method of manufacturing the secondary battery. The secondary battery may be manufactured by the following procedure, for example.

[Fabrication of Cathode]

In a case where the cathode 21 is fabricated, first, the cathode active material, and, on as-necessary basis, for example, the cathode binder and the cathode conductor may be mixed to obtain a cathode mixture. Subsequently, the cathode mixture may be dissolved or dispersed in, for example, an organic solvent to obtain paste cathode mixture slurry. Lastly, both surfaces of the cathode current collector 21A may be coated with the cathode mixture slurry, and thereafter, the coated cathode mixture slurry may be dried to form the cathode active material layers 21B. Thereafter, the cathode active material layers 21B may be compression-molded with use of, for example, a roll pressing machine on as-necessary basis. In this case, the cathode active material layers 21B may be heated, or may be compression-molded a plurality of times.

[Fabrication of Anode]

In a case where the anode 22 is fabricated, the anode active material layers 22B may be formed on both surfaces of the anode current collector 22A by a procedure similar to the foregoing procedure of fabricating the cathode 21. More specifically, the anode active material, and any other material such as the anode binder and the anode conductor may be mixed to obtain an anode mixture. Subsequently, the anode mixture may be dissolved or dispersed in, for example, an organic solvent to obtain paste anode mixture slurry. Next, both surfaces of the anode current collector 22A may be coated with the anode mixture slurry, and thereafter, the coated anode mixture slurry may be dried to form the anode active material layers 22B.

[Preparation of Electrolytic Solution]

In a case where the electrolytic solution is prepared, the electrolyte salt may be added to the solvent, and the solvent may be stirred to dissolve or disperse the electrolyte salt in the solvent. Subsequently, the dicarbonyl compound may be added to the solvent including the electrolyte salt, and thereafter, the solvent may be stirred to dissolve or disperse the dicarbonyl compound in the solvent, thereby preparing the electrolytic solution including the dicarbonyl compound.

[Assembling of Secondary Battery]

In a case where the secondary battery is assembled, the cathode lead 25 may be coupled to the cathode current collector 21A by, for example, a welding method, and the anode lead 26 may be coupled to the anode current collector 22A by, for example, a welding method. Subsequently, the cathode 21 and the anode 22 may be stacked with the separator 23 in between, and the cathode 21, the anode 22, and the separator 23 may be spirally wound to form a spirally wound body. Thereafter, the center pin 24 may be inserted in a space provided at the center of the spirally wound body.

Subsequently, the spirally wound body may be sandwiched between the pair of insulating plates 12 and 13, and may be contained inside the battery can 11. In this case, the cathode lead 25 may be coupled to the safety valve mechanism 15 by, for example, a welding method, and the anode lead 26 may be coupled to the battery can 11 by, for example, a welding method. Subsequently, the electrolytic solution may be injected inside the battery can 11, and the spirally wound body may be impregnated with the injected electrolytic solution. Thus, the cathode 21, the anode 22, and the separator 23 may be impregnated with the electrolytic solution, thereby forming the spirally wound electrode body 20.

Lastly, the battery cover 14, the safety valve mechanism 15, and the PTC device 16 may be swaged with the gasket 17 at the open end of the battery can 11, thereby enclosing the spirally wound electrode body 20 in the battery can 11. Thus, the secondary battery is completed.

<1-4. Action and Effects>

According to the cylindrical type secondary battery, the anode 22 includes the titanium-containing compound, and the electrolytic solution includes an appropriate amount (=0.01 wt % to 5 wt % both inclusive) of the dicarbonyl compound. In this case, a coating film derived from the dicarbonyl compound is formed on the surface of the anode 22 during charge and discharge, as described above, thereby specifically decreasing irreversible capacity during the initial charge and the initial discharge. This makes it possible to obtain high discharge capacity from the initial charge and the initial discharge, and even if charge and discharge are repeated, the discharge capacity is less prone to be decreased. This makes it possible to achieve superior battery characteristics.

In particular, the monovalent hydrocarbon group is, for example, the alkyl group, the alkali metal is, for example, lithium, and the trivalent hydrocarbon group is, for example, the group in which three hydrogen groups are eliminated from alkane, which facilitate formation of a sufficiently strong coating film on the surface of the anode 22. This makes it possible to achieve a higher effect.

Moreover, the number of carbons in the alkylene group is from 1 to 6, the number of carbons in the alkyl group is from 1 to 6, and the number of carbons in a portion (the alkylene group) other than the carboxyl group of the alkylcarboxyl group is from 1 to 6, which improve solubility, compatibility, and other properties of the dicarbonyl compound. This makes it possible to achieve a higher effect.

Further, the first dicarbonyl compound is one or both of the respective compounds represented by the formulas (7) and (8), which facilitates formation of a stronger coating film on the surface of the anode 22. This makes it possible to achieve a higher effect.

Furthermore, the second dicarbonyl compound is the compound represented by the formula (9), which facilitates formation of a stronger coating film on the surface of the anode 22. This makes it possible to achieve a higher effect.

Moreover, the fourth dicarbonyl compound is the compound represented by the formula (10), which facilitates formation of a stronger coating film on the surface of the anode 22. This makes it possible to achieve a higher effect.

Further, the titanium-containing compound includes one or both of the titanium oxide and the lithium-titanium composite oxide, which suppresses decomposition reaction of the electrolytic solution resulting from reactivity of the anode 22. This makes it possible to achieve a higher effect.

<2. Secondary Battery (Laminated Film Type)>

Next, description is given of another secondary battery according to the embodiment of the technology. In the following description, the components of the cylindrical type secondary battery that have been already described are used where appropriate.

<2-1. Configuration>

Figure 3:
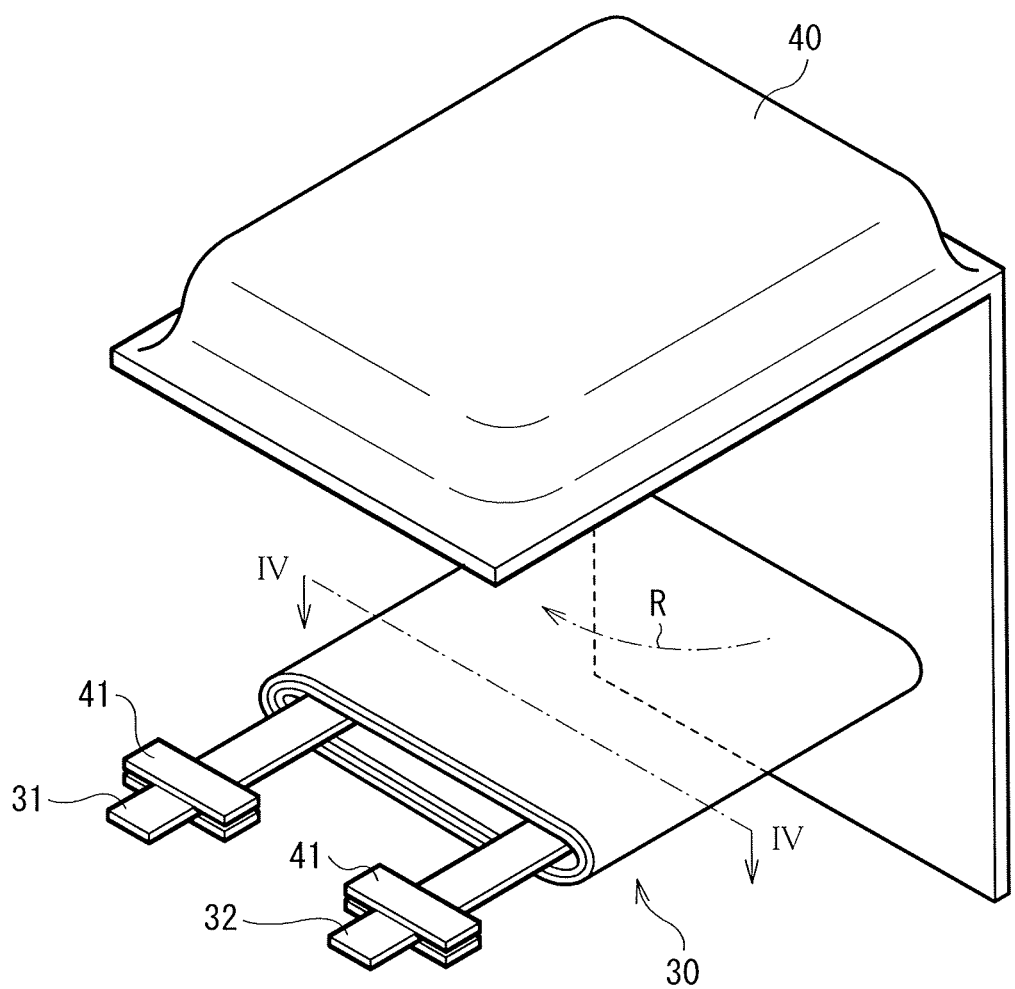
FIG. 3 is a perspective view of a configuration of another secondary battery (laminated film type) according to the embodiment of the technology.
Figure 4:
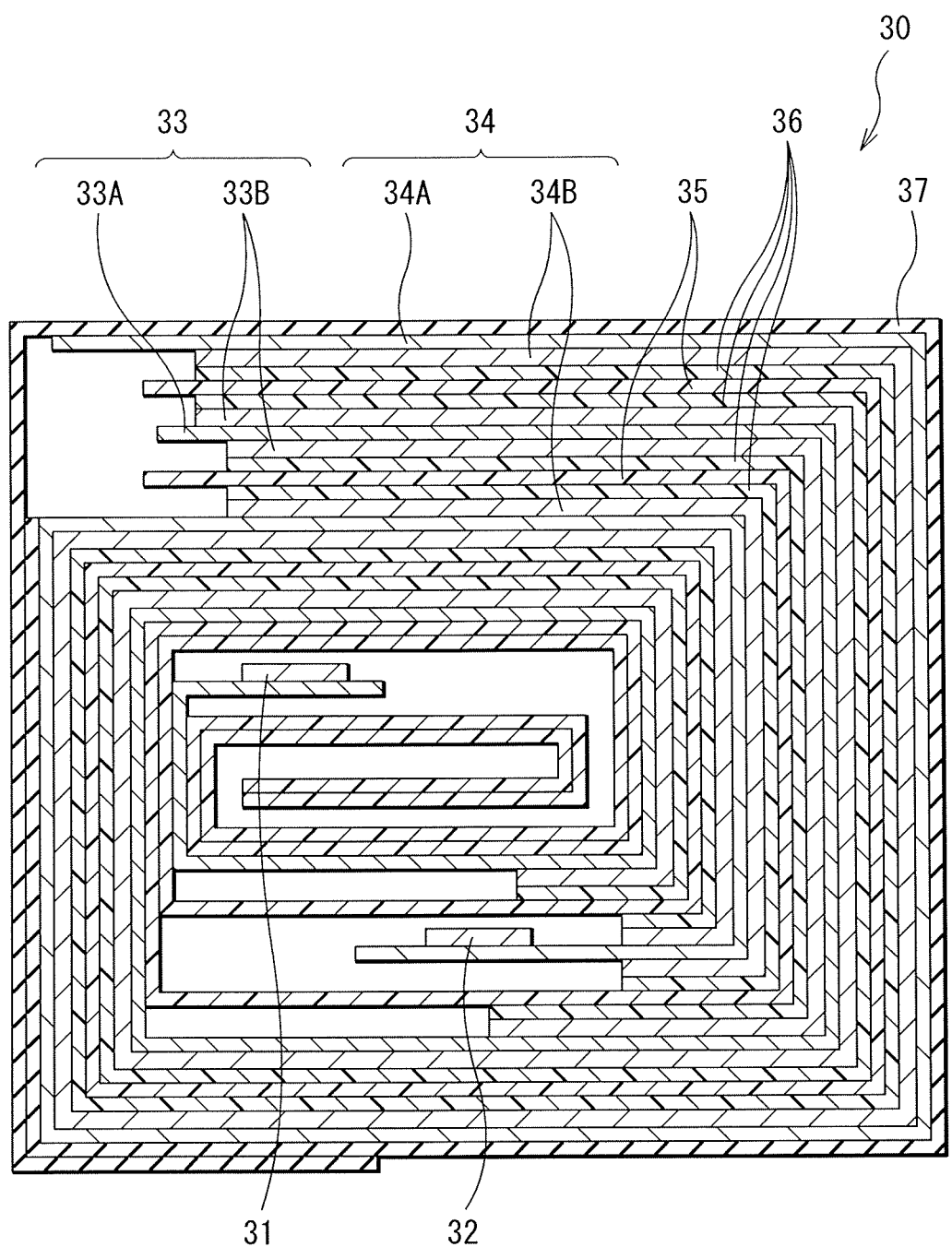
FIG. 4 is an enlarged cross-sectional view taken along a line IV-IV of a spirally wound electrode body illustrated in FIG. 3.

FIG. 3 illustrates a perspective configuration of another secondary battery. FIG. 4 illustrates a cross-sectional configuration taken along a line IV-IV of a spirally wound electrode body 30 illustrated in FIG. 3. It is to be noted that FIG. 3 illustrates a state in which the spirally wound electrode body 30 and an outer package member 40 are separated from each other.

As can be seen from FIG. 3, the secondary battery may be, for example, a laminated film type secondary battery (lithium-ion secondary battery) in which the spirally wound electrode body 30 as a battery element is contained inside the film-like outer package member 40.

More specifically, for example, the secondary battery may include the spirally wound electrode body 30 inside the film-like outer package member 40, as illustrated in FIG. 3. The spirally wound electrode body 30 may be formed as follows, for example. A cathode 33 and an anode 34 may be stacked with a separator 35 and an electrolyte layer 36 in between, and the cathode 33, the anode 34, the separator 35, and the electrolyte layer 36 may be spirally wound to form the spirally wound electrode body 30. An outermost periphery of the spirally wound electrode body 30 may be protected by a protective tape 37. The electrolyte layer 36 may be interposed, for example, between the cathode 33 and the separator 35 and may be interposed, for example, between the anode 34 and the separator 35. A cathode lead 31 may be attached to the cathode 33, and an anode lead 32 may be attached to the anode 34.

Each of the cathode lead 31 and the anode lead 32 may be led out from inside to outside of the outer package member 40, for example. The cathode lead 31 may include, for example, one or more of conductive materials such as aluminum (Al), and the cathode lead 31 may have a thin-plate state or a mesh state. The anode lead 32 may include, for example, one or more of conductive materials such as copper (Cu), nickel (Ni), and stainless steel, and the anode lead 32 may have, for example, a state similar to that of the cathode lead 31.

[Outer Package Member]

The outer package member 40 may be, for example, one film that is foldable in a direction of an arrow R illustrated in FIG. 3, and the outer package member 40 may have a depression for containing of the spirally wound electrode body 30. The outer package member 40 may be a laminated film in which a surface protective layer, a metal layer, and a fusion bonding layer are laminated in this order, for example. In a process of manufacturing the secondary battery, the outer package member 40 may be folded so that portions of the fusion-bonding layer face each other with the spirally wound electrode body 30 in between, and thereafter outer edges of the portions of the fusion bonding layer may be fusion-bonded. Alternatively, two laminated films bonded to each other by, for example, an adhesive may form the outer package member 40.

The surface protective layer may include, for example, one or more of films of nylon, polyethylene terephthalate, and other materials. The metal layer may include, for example, one or more of an aluminum foil and other metal materials. The fusion bonding layer may include one or more of films of polyethylene, polypropylene, and other materials.

In particular, the outer package member 40 may be preferably an aluminum laminated film in which a nylon film, an aluminum foil, and a polyethylene film are laminated in this order. Alternatively, the outer package member 40 may be a laminated film having any other laminated structure, a polymer film such as polypropylene, or a metal film.

For example, an adhesive film 41 for prevention of outside air intrusion may be inserted between the outer package member 40 and the cathode lead 31. Moreover, for example, the foregoing adhesive film 41 may be inserted between the outer package member 40 and the anode lead 32. The adhesive film 41 may include a material having adhesibility with respect to the cathode lead 31 and the anode lead 32. Non-limiting examples of the material having adhesibility may include a polyolefin resin. More specifically, the material having adhesibility may include one or more of polyethylene, polypropylene, modified polyethylene, and modified polypropylene.

[Cathode, Anode, and Separator]

The cathode 33 may include, for example, a cathode current collector 33A and a cathode active material layer 33B, as illustrated in FIG. 4. The anode 34 may include, for example, an anode current collector 34A and an anode active material layer 34B. The configurations of the cathode current collector 33A, the cathode active material layer 33B, the anode current collector 34A, and the anode active material layer 34B may be similar to, for example, the configurations of the cathode current collector 21A, the cathode active material layer 21B, the anode current collector 22A, and the anode active material layer 22B, respectively. In other words, the anode 34 may include the titanium-containing compound. The configuration of the separator 35 may be similar to, for example, the configuration of the separator 23.

[Electrolyte Layer]

The electrolyte layer 36 may include an electrolytic solution and a polymer compound. The configuration of the electrolytic solution may be similar to, for example, the configuration of the electrolytic solution used in the foregoing cylindrical type secondary battery. In other words, the electrolytic solution may include the dicarbonyl compound.

The electrolyte layer 36 described here may be a so-called gel electrolyte, and the electrolytic solution may be held by the polymer compound. The gel electrolyte achieves high ionic conductivity (for example, 1 mS/cm or more at room temperature), and prevents liquid leakage of the electrolytic solution. It is to be noted that the electrolyte layer 36 may further include one or more of other materials such as an additive.

The polymer material may include, for example, one or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, poly(methyl methacrylate), polyacrylic acid, polymethacrylic acid, styrene-butadiene rubber, nitrile-butadiene rubber, polystyrene, and polycarbonate. In addition thereto, the polymer material may be a copolymer. The copolymer may be, for example, a copolymer of vinylidene fluoride and hexafluoropropylene. In particular, polyvinylidene fluoride may be preferable as a homopolymer, and a copolymer of vinylidene fluoride and hexafluoropylene may be preferable as a copolymer. Such polymer compounds are electrochemically stable.

In the electrolyte layer 36 that is a gel electrolyte, the solvent included in the electrolytic solution refers to a wide concept that encompasses not only a liquid material but also a material having ionic conductivity that has ability to dissociate the electrolyte salt. Hence, in a case where a polymer compound having ionic conductivity is used, the polymer compound is also encompassed by the nonaqueous solvent.

It is to be noted that the electrolytic solution may be used instead of the electrolyte layer 36. In this case, the spirally wound electrode body 30 is impregnated with the electrolytic solution.

<2-2. Operation>

The secondary battery may operate as follows, for example.

When the secondary battery is charged, lithium ions are extracted from the cathode 33, and the extracted lithium ions are inserted in the anode 34 through the electrolyte layer 36. In contrast, when the secondary battery is discharged, lithium ions are extracted from the anode 34, and the extracted lithium ions are inserted in the cathode 33 through the electrolyte layer 36.

<2-3. Manufacturing Method>

The secondary battery including the gel electrolyte layer 36 may be manufactured, for example, by one of the following three procedures.

[First Procedure]

First, the cathode 33 and the anode 34 may be fabricated by a fabrication procedure similar to that of the cathode 21 and the anode 22. More specifically, the cathode 33 may be fabricated by forming the cathode active material layers 33B on both surfaces of the cathode current collector 33A, and the anode 34 may be fabricated by forming the anode active material layers 34B on both surfaces of the anode current collector 34A.

Subsequently, for example, the electrolytic solution, the polymer compound, an organic solvent, etc. may be mixed to prepare a sol precursor solution. Subsequently, the cathode 33 may be coated with the precursor solution, and the coated precursor solution may be dried to form the gel electrolyte layer 36. Further, the anode 34 may be coated with the precursor solution, and the coated precursor solution may be dried to form the gel electrolyte layer 36. Subsequently, the cathode lead 31 may be coupled to the cathode current collector 33A by, for example, a welding method, and the anode lead 32 may be coupled to the anode current collector 34A by, for example, a welding method. Subsequently, the cathode 33 provided with the electrolyte layer 36 and the anode 34 provided with the electrolyte layer 36 may be stacked with the separator 35 in between, and thereafter, the cathode 33, the anode 34, the separator 35, and the electrolyte layers 36 may be spirally wound to fabricate the spirally wound electrode body 30. Thereafter, the protective tape 37 may be attached onto the outermost periphery of the spirally wound body 30.

Lastly, the outer package member 40 may be folded to interpose the spirally wound electrode body 30, and thereafter, the outer edges of the outer package member 40 may be bonded by, for example, a thermal fusion bonding method to enclose the spirally wound electrode body 30 in the outer package member 40. In this case, the adhesive film 41 may be inserted between the cathode lead 31 and the outer package member 40, and the adhesive film 41 may be inserted between the anode lead 32 and the outer package member 40. Thus, the spirally wound electrode body 30 may be sealed in the outer package member 40 to complete the secondary battery.

[Second Procedure]

First, the cathode 33 and the anode 34 may be fabricated by a procedure similar to the first procedure, and thereafter the cathode lead 31 may be coupled to the cathode 33, and the anode lead 32 may be coupled to the anode 34. Subsequently, the cathode 33 and the anode 34 may be stacked with the separator 35 in between and may be spirally wound to fabricate a spirally wound body as a precursor of the spirally wound electrode body 30. Thereafter, the protective tape 37 may be adhered to the outermost periphery of the spirally wound body. Subsequently, the outer package member 40 may be folded to interpose the spirally wound body, and thereafter, the outer edges other than one side of the outer package member 40 may be bonded by, for example, a thermal fusion bonding method, and the spirally wound body may be contained inside a pouch formed of the outer package member 40. Subsequently, the electrolytic solution, monomers that are raw materials of the polymer compound, a polymerization initiator, and, on as-necessary basis, other materials such as a polymerization inhibitor may be mixed to prepare a composition for electrolyte. Subsequently, the composition for electrolyte may be injected inside the pouch formed of the outer package member 40. Thereafter, the pouch formed of the outer package member 40 may be hermetically sealed by, for example, a thermal fusion bonding method. Subsequently, the monomers may be thermally polymerized to form the polymer compound. Accordingly, the electrolytic solution may be held by the polymer compound to form the gel electrolyte layer 36. Thus, the secondary battery is completed.

[Third Procedure]

First, the spirally wound body may be fabricated, and then contained inside the pouch formed of the outer package member 40 by a procedure similar to the second procedure, except that the separator 35 provided with the polymer compound layer is used. Subsequently, the electrolytic solution may be injected inside the pouch formed of the outer package member 40. Thereafter, an opening of the pouch formed of the outer package member 40 may be hermetically sealed by, for example, a thermal fusion bonding method. Subsequently, the outer package member 40 may be heated while a weight is applied to the outer package member 40 to cause the separator 35 to be closely attached to the cathode 33 with the polymer compound layer in between and to be closely attached to the anode 34 with the polymer compound layer in between. Through this heating treatment, each of the polymer compound layers may be impregnated with the electrolytic solution, and each of the polymer compound layers may be gelated. Accordingly, the electrolyte layer 36 may be formed. Thus, the secondary battery is completed.

In the third procedure, swollenness of the secondary battery is suppressed more than in the first procedure. Further, in the third procedure, for example, the nonaqueous solvent and the monomers (the raw materials of the polymer compound) are hardly left in the electrolyte layer 36, as compared with the second procedure. Accordingly, the formation process of the polymer compound is favorably controlled. As a result, each of the cathode 33, the anode 34, and the separator 35 is sufficiently and closely attached to the electrolyte layer 36.

<2-4. Action and Effects>

According to the laminated film type secondary battery, the anode 34 includes the titanium-containing compound, and the electrolyte layer 36 (the electrolytic solution) includes the dicarbonyl compound. Accordingly, irreversible capacity during the initial charge and the initial discharge is specifically decreased for a reason similar to the reason described related to the cylindrical type secondary battery, which makes it possible to achieve superior battery characteristics.

Action and effects other than those described above are similar to those of the cylindrical type secondary battery.

<3. Applications of Secondary Battery>

Next, description is given of application examples of any of the secondary batteries mentioned above.

Applications of the secondary battery are not particularly limited as long as the secondary battery is applied to, for example, a machine, a device, an instrument, an apparatus, and a system (a collective entity of, for example, a plurality of devices) that are able to use the secondary battery as a driving power source, an electric power storage source for electric power accumulation, or any other source. The secondary battery used as the power source may be a main power source or an auxiliary power source. The main power source is a power source used preferentially irrespective of presence or absence of any other power source. The auxiliary power source may be a power source used instead of the main power source or used being switched from the main power source on as-necessary basis. In a case where the secondary battery is used as the auxiliary power source, the kind of the main power source is not limited to the secondary battery.

Examples of the applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof may include: a mobile lifestyle appliance such as an electric shaver; a storage device such as a backup power source and a memory card; an electric power tool such as an electric drill and an electric saw; a battery pack used as an attachable and detachable power source of, for example, a notebook personal computer; a medical electronic apparatus such as a pacemaker and a hearing aid; an electric vehicle such as an electric automobile (including a hybrid automobile); and an electric power storage system such as a home battery system for accumulation of electric power for, for example, emergency. It goes without saying that the secondary battery may be employed for an application other than the applications mentioned above.

In particular, the secondary battery may be effectively applicable to, for example, the battery pack, the electric vehicle, the electric power storage system, the electric power tool, and the electronic apparatus. In these applications, superior battery characteristics are demanded, and using the secondary battery of any of the embodiments of the technology makes it possible to effectively improve performance. It is to be noted that the battery pack is a power source that uses the secondary battery, and may use, for example, a single battery and an assembled battery, as described later. The electric vehicle is a vehicle that operates (runs) using the secondary battery as a driving power source, and may be an automobile (such as a hybrid automobile) that includes together a drive source other than the secondary battery, as described above. The electric power storage system is a system that uses the secondary battery as an electric power storage source. For example, in a home electric power storage system, electric power is accumulated in the secondary battery that is the electric power storage source, which makes it possible to use, for example, home electric products with use of the accumulated electric power. The electric power tool is a tool in which a movable section (such as a drill) is allowed to be moved with use of the secondary battery as a driving power source. The electronic apparatus is an apparatus that executes various functions with use of the secondary battery as a driving power source (an electric power supply source).

Hereinafter, specific description is given of some application examples of the secondary battery. It is to be noted that configurations of the respective application examples described below are mere examples, and may be changed as appropriate.

<3-1. Battery Pack (Single Battery)>

Figure 5:
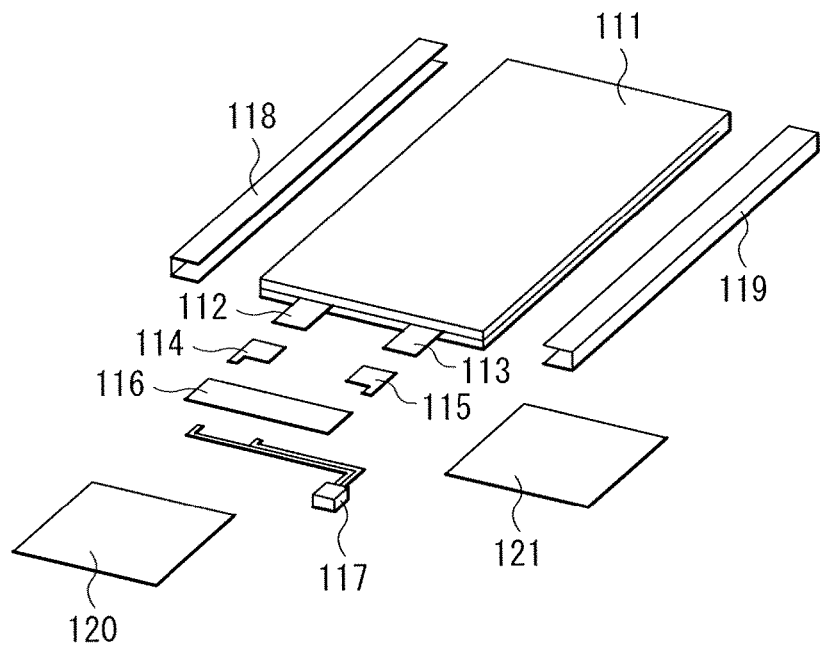
FIG. 5 is a perspective view of a configuration of an application example (a battery pack: single battery) of the secondary battery.
Figure 6:
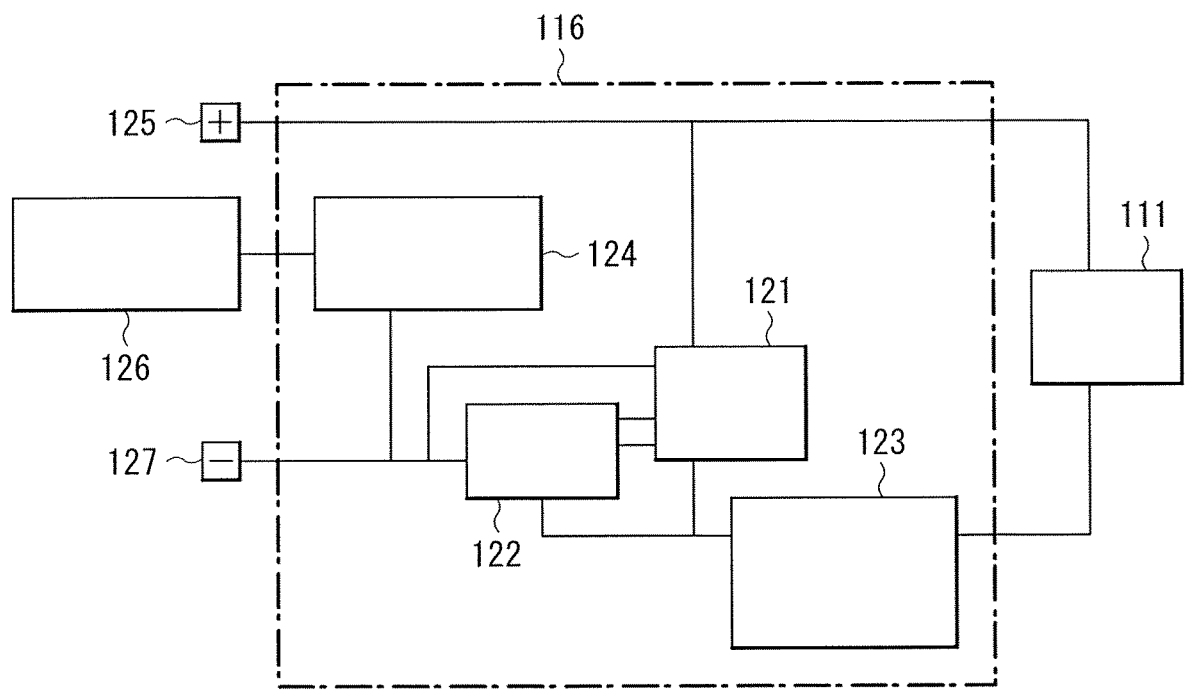
FIG. 6 is a block diagram illustrating a configuration of the battery pack illustrated in FIG. 5.

FIG. 5 illustrates a perspective configuration of a battery pack using a single battery. FIG. 6 illustrates a block configuration of the battery pack illustrated in FIG. 5. It is to be noted that FIG. 5 illustrates the battery back in an exploded state.

The battery back described here is a simple battery pack using one secondary battery (a so-called soft pack), and may be mounted in, for example, an electronic apparatus typified by a smartphone. For example, the battery pack may include a power source 111 that is the laminated film type secondary battery, and a circuit board 116 coupled to the power source 111, as illustrated in FIG. 5. A cathode lead 112 and an anode lead 113 may be attached to the power source 111.

A pair of adhesive tapes 118 and 119 may be adhered to both side surfaces of the power source 111. A protection circuit module (PCM) may be formed in the circuit board 116. The circuit board 116 may be coupled to the cathode lead 112 through a tab 114, and be coupled to the anode lead 113 through a tab 115. Moreover, the circuit board 116 may be coupled to a lead 117 provided with a connector for external connection. It is to be noted that while the circuit board 116 is coupled to the power source 111, the circuit board 116 may be protected by a label 120 and an insulating sheet 121. The label 120 may be used to fix, for example, the circuit board 116 and the insulating sheet 121.

Moreover, for example, the battery pack may include the power source 111 and the circuit board 116 as illustrated in FIG. 6. The circuit board 116 may include, for example, a controller 121, a switch section 122, a PTC device 123, and a temperature detector 124. The power source 111 may be connectable to outside through a cathode terminal 125 and an anode terminal 127, and may be thereby charged and discharged through the cathode terminal 125 and the anode terminal 127. The temperature detector 124 may detect a temperature with use of a temperature detection terminal (a so-called T terminal) 126.

The controller 121 controls an operation of the entire battery pack (including a used state of the power source 111), and may include, for example, a central processing unit (CPU) and a memory.

For example, in a case where a battery voltage reaches an overcharge detection voltage, the controller 121 may so cause the switch section 122 to be disconnected that a charge current does not flow into a current path of the power source 111. Moreover, for example, in a case where a large current flows during charge, the controller 121 may cause the switch section 122 to be disconnected, thereby blocking the charge current.

In contrast, for example, in a case where the battery voltage reaches an overdischarge detection voltage, the controller 121 may so cause the switch section 122 to be disconnected that a discharge current does not flow into the current path of the power source 111. Moreover, for example, in a case where a large current flows during discharge, the controller 121 may cause the switch section 122 to be disconnected, thereby blocking the discharge current.

It is to be noted that the overcharge detection voltage is not particularly limited, but may be, for example, 4.2 V±0.05 V, and the overdischarge detection voltage is not particularly limited, but may be, for example, 2.4 V±0.1 V.

The switch section 122 switches the used state of the power source 111, that is, presence or absence of connection of the power source 111 to an external device in accordance with an instruction from the controller 121. The switch section 122 may include, for example, a charge control switch and a discharge control switch. The charge control switch and the discharge control switch each may be, for example, a semiconductor switch such as a field-effect transistor using a metal oxide semiconductor (MOSFET). It is to be noted that the charge current and the discharge current may be detected on the basis of on-resistance of the switch section 122.

The temperature detector 124 measures a temperature of the power source 111, and outputs a result of the measurement to the controller 121. The temperature detector 124 may include, for example, a temperature detecting element such as a thermistor. It is to be noted that the result of the measurement by the temperature detector 124 may be used, for example, in a case where the controller 121 performs charge and discharge control at the time of abnormal heat generation and in a case where the controller 121 performs a correction process at the time of calculating remaining capacity.

It is to be noted that the circuit board 116 may not include the PTC device 123. In this case, a PTC device may be separately attached to the circuit board 116.

<3-2. Battery Pack (Assembled Battery)>

Figure 7:
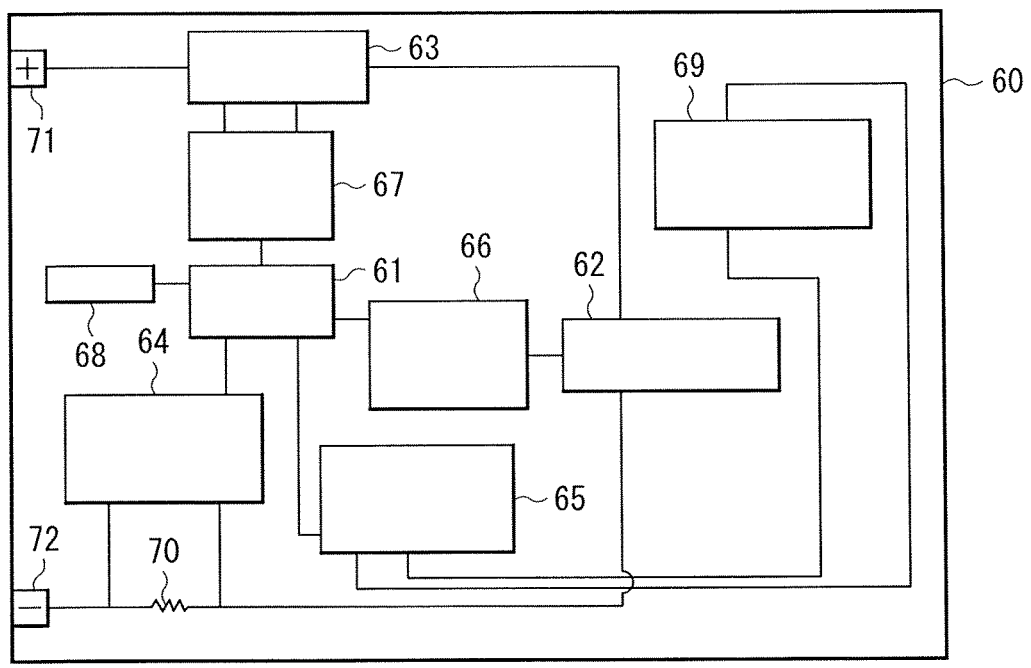
FIG. 7 is a block diagram illustrating a configuration of an application example (a battery pack: assembled battery) of the secondary battery.

FIG. 7 illustrates a block configuration of a battery pack using an assembled battery.

For example, the battery pack may include a controller 61, a power source 62, a switch section 63, a current measurement section 64, a temperature detector 65, a voltage detector 66, a switch controller 67, a memory 68, a temperature detecting element 69, a current detection resistance 70, a cathode terminal 71, and an anode terminal 72 inside a housing 60. The housing 60 may include, for example, a plastic material.

The controller 61 controls an operation of the entire battery pack (including a used state of the power source 62). The controller 61 may include, for example, a CPU. The power source 62 may be, for example, an assembled battery that includes two or more secondary batteries. The secondary batteries may be connected in series, in parallel, or in series-parallel combination. To give an example, the power source 62 may include six secondary batteries in which two sets of series-connected three batteries are connected in parallel to each other.

The switch section 63 switches the used state of the power source 62, that is, presence or absence of connection of the power source 62 to an external device in accordance with an instruction from the controller 61. The switch section 63 may include, for example, a charge control switch, a discharge control switch, a charging diode, and a discharging diode. The charge control switch and the discharge control switch each may be, for example, a semiconductor switch such as a field-effect transistor that uses a metal oxide semiconductor (a MOSFET).

The current measurement section 64 measures a current with use of the current detection resistance 70, and outputs a result of the measurement to the controller 61. The temperature detector 65 measures a temperature with use of the temperature detecting element 69, and outputs a result of the measurement to the controller 61. The result of the temperature measurement may be used, for example, in a case where the controller 61 performs charge and discharge control at the time of abnormal heat generation and in a case where the controller 61 performs a correction process at the time of calculating remaining capacity. The voltage detector 66 measures voltages of the secondary batteries in the power source 62, performs analog-to-digital conversion on the measured voltage, and supplies the resultant to the controller 61.

The switch controller 67 controls an operation of the switch section 63 in accordance with signals inputted from the current measurement section 64 and the voltage detector 66.

For example, in a case where a battery voltage reaches an overcharge detection voltage, the switch controller 67 may so cause the switch section 63 (the charge control switch) to be disconnected that a charge current does not flow into a current path of the power source 62. This makes it possible to perform only discharge through the discharging diode in the power source 62. It is to be noted that, for example, when a large current flows during charge, the switch controller 67 may block the charge current.

Further, for example, in a case where the battery voltage reaches an overdischarge detection voltage, the switch controller 67 may so cause the switch section 63 (the discharge control switch) to be disconnected that a discharge current does not flow into the current path of the power source 62. This makes it possible to perform only charge through the charging diode in the power source 62. It is to be noted that, for example, when a large current flows during discharge, the switch controller 67 may block the discharge current.

It is to be noted that the overcharge detection voltage is not particularly limited, but may be, for example, 4.2 V±0.05 V, and the overdischarge detection voltage is not particularly limited, but may be, for example, 2.4 V±0.1 V.

The memory 68 may include, for example, an EEPROM that is a non-volatile memory. The memory 68 may hold, for example, numerical values calculated by the controller 61 and information of the secondary battery measured in a manufacturing process (such as internal resistance in an initial state). It is to be noted that, in a case where the memory 68 holds full charge capacity of the secondary battery, the controller 61 is allowed to comprehend information such as remaining capacity.

The temperature detecting element 69 measures a temperature of the power source 62, and outputs a result of the measurement to the controller 61. The temperature detecting element 69 may include, for example, a thermistor.

The cathode terminal 71 and the anode terminal 72 are terminals that may be coupled to, for example, an external device (such as a notebook personal computer) driven with use of the battery pack or an external device (such as a battery charger) used for charge of the battery pack. The power source 62 is charged and discharged via the cathode terminal 71 and the anode terminal 72.

<3-3. Electric Vehicle>

Figure 8:
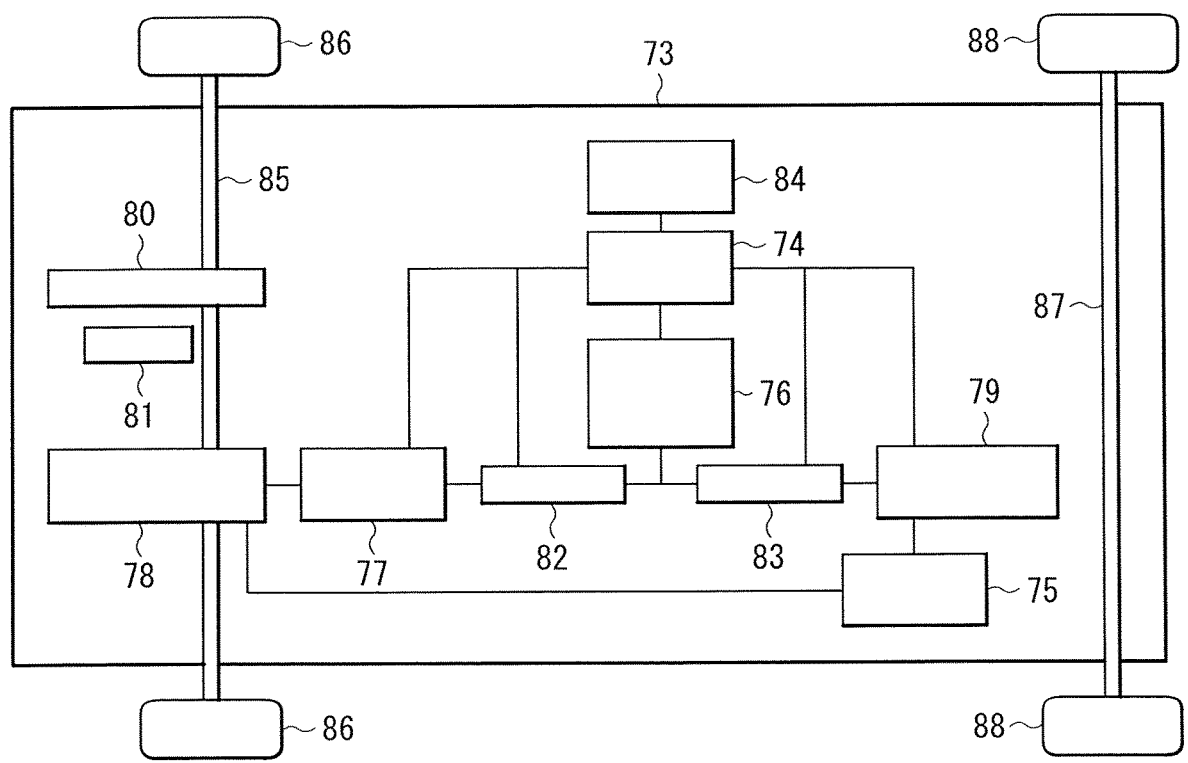
FIG. 8 is a block diagram illustrating a configuration of an application example (an electric vehicle) of the secondary battery.

FIG. 8 illustrates a block configuration of a hybrid automobile that is an example of an electric vehicle.

The electric vehicle may include, for example, a controller 74, an engine 75, a power source 76, a driving motor 77, a differential 78, an electric generator 79, a transmission 80, a clutch 81, inverters 82 and 83, and various sensors 84 inside a housing 73 made of metal. Other than the components mentioned above, the electric vehicle may include, for example, a front drive shaft 85 and a front tire 86 that are coupled to the differential 78 and the transmission 80, and a rear drive shaft 87, and a rear tire 88.

The electric vehicle may be runnable with use of one of the engine 75 and the motor 77 as a drive source, for example. The engine 75 is a main power source, and may be, for example, a petrol engine. In a case where the engine 75 is used as the power source, drive power (torque) of the engine 75 may be transferred to the front tire 86 or the rear tire 88 via the differential 78, the transmission 80, and the clutch 81 that are drive sections, for example. It is to be noted that the torque of the engine 75 may be also transferred to the electric generator 79. With use of the torque, the electric generator 79 generates alternating-current electric power. The generated alternating-current electric power is converted into direct-current electric power via the inverter 83, and the converted electric power is accumulated in the power source 76. In a case where the motor 77 that is a conversion section is used as the power source, electric power (direct-current electric power) supplied from the power source 76 is converted into alternating-current electric power via the inverter 82, and the motor 77 is driven with use of the alternating-current electric power. Drive power (torque) obtained by converting the electric power by the motor 77 may be transferred to the front tire 86 or the rear tire 8 via the differential 78, the transmission 80, and the clutch 81 that are the drive sections, for example.

It is to be noted that in a case where speed of the electric vehicle is reduced by a brake mechanism, resistance at the time of speed reduction may be transferred to the motor 77 as torque, and the motor 77 may generate alternating-current electric power by utilizing the torque. It may be preferable that this alternating-current electric power be converted into direct-current electric power via the inverter 82, and the direct-current regenerative electric power be accumulated in the power source 76.

The controller 74 controls an operation of the entire electric vehicle, and may include, for example, a CPU. The power source 76 includes one or more secondary batteries. The power source 76 may be coupled to an external power source, and the power source 76 may be allowed to accumulate electric power by receiving electric power supply from the external power source. The various sensors 84 may be used, for example, for control of the number of revolutions of the engine 75 and for control of an opening level (a throttle opening level) of a throttle valve. The various sensors 84 may include, for example, a speed sensor, an acceleration sensor, and an engine frequency sensor.

It is to be noted that, although the description has been given with reference to an example in which the electric vehicle is the hybrid automobile, the electric vehicle may be a vehicle (an electric automobile) that operates with use of only the power source 76 and the motor 77 and without using the engine 75.

<3-4. Electric Power Storage System>

Figure 9:
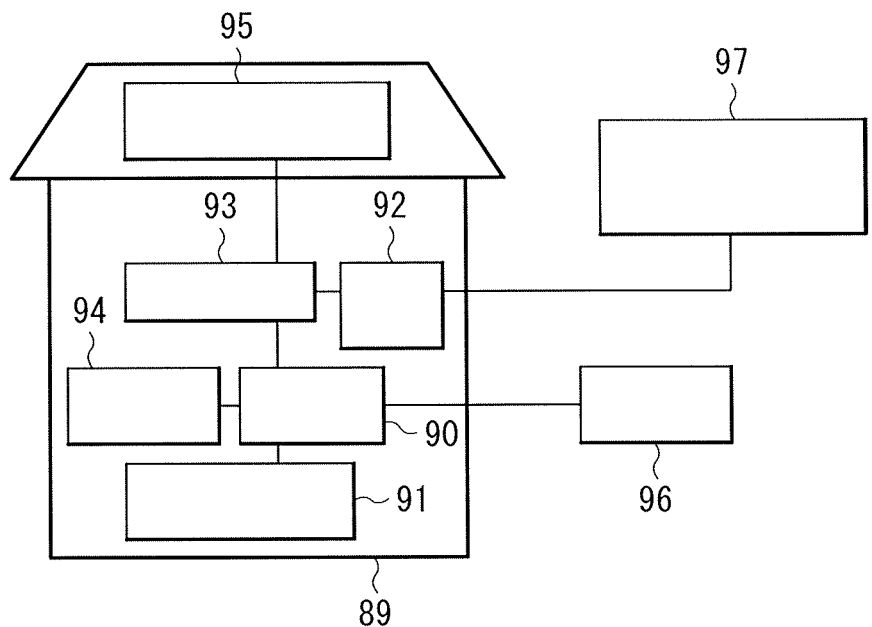
FIG. 9 is a block diagram illustrating a configuration of an application example (an electric power storage system) of the secondary battery.

FIG. 9 illustrates a block configuration of an electric power storage system.

The electric power storage system may include, for example, a controller 90, a power source 91, a smart meter 92, and a power hub 93 inside a house 89 such as a general residence or a commercial building.

In this example, the power source 91 may be coupled to an electric device 94 provided inside the house 89 and may be allowed to be coupled to an electric vehicle 96 parked outside the house 89, for example. Further, for example, the power source 91 may be coupled to a private power generator 95 provided in the house 89 via the power hub 93, and may be allowed to be coupled to an outside concentrating electric power system 97 via the smart meter 92 and the power hub 93.

It is to be noted that the electric device 94 may include, for example, one or more home electric products. Non-limiting examples of the home electric products may include a refrigerator, an air conditioner, a television, and a water heater. The private power generator 95 may include, for example, one or more of a solar power generator, a wind power generator, and other power generators. The electric vehicle 96 may include, for example, one or more of an electric automobile, an electric motorcycle, a hybrid automobile, and other electric vehicles. The concentrating electric power system 97 may include, for example, one or more of a thermal power plant, an atomic power plant, a hydraulic power plant, a wind power plant, and other power plants.

The controller 90 controls an operation of the entire electric power storage system (including a used state of the power source 91), and may include, for example, a CPU. The power source 91 includes one or more secondary batteries. The smart meter 92 may be an electric power meter that is compatible with a network and is provided in the house 89 demanding electric power, and may be communicable with an electric power supplier, for example. Accordingly, for example, while the smart meter 92 communicates with outside, the smart meter 92 controls balance between supply and demand in the house 89, which allows for effective and stable energy supply.

In the electric power storage system, for example, electric power may be accumulated in the power source 91 from the concentrating electric power system 97, that is an external power source, via the smart meter 92 and the power hub 93, and electric power may be accumulated in the power source 91 from the private power generator 95, that is an independent power source, via the power hub 93. The electric power accumulated in the power source 91 is supplied to the electric device 94 and the electric vehicle 96 in accordance with an instruction from the controller 90. This allows the electric device 94 to be operable, and allows the electric vehicle 96 to be chargeable. In other words, the electric power storage system is a system that makes it possible to accumulate and supply electric power in the house 89 with use of the power source 91.

The electric power accumulated in the power source 91 is allowed to be utilized optionally. Hence, for example, electric power may be accumulated in the power source 91 from the concentrating electric power system 97 in the middle of night when an electric rate is inexpensive, and the electric power accumulated in the power source 91 may be used during daytime hours when the electric rate is expensive.

It is to be noted that the foregoing electric power storage system may be provided for each household (each family unit), or may be provided for a plurality of households (a plurality of family units).

Moreover, the electric power storage system may be applied not only to the consumer applications such as the foregoing general residence but also to commercial applications such as the foregoing concentrating electric power system 97, i.e., an electric power supply source typified by a thermal power plant, an atomic power plant, a hydraulic power plant, and a wind power plant. More specifically, description has been given with reference to the case where the electric power storage system is applied to household applications; however, the electric power storage system may be applied to, for example, industrial applications such as an electric power network for grid-connected power (so-called grid) to be used as an electric storage apparatus.

<3-5. Electric Power Tool>

Figure 10:
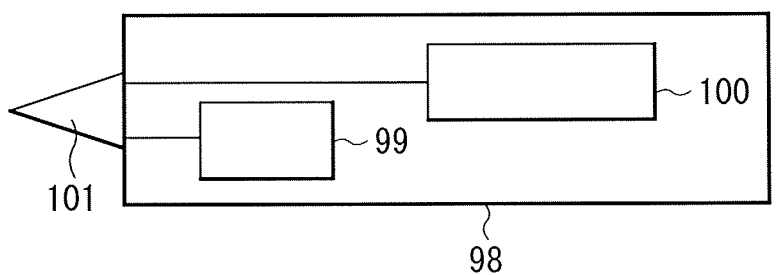
FIG. 10 is a block diagram illustrating a configuration of an application example (an electric power tool) of the secondary battery.

FIG. 10 illustrates a block configuration of an electric power tool.

The electric power tool described here may be, for example, an electric drill. The electric power tool may include a controller 99 and a power source 100 inside a tool body 98, for example. A drill section 101 that is a movable section may be attached to the tool body 98 in an operable (rotatable) manner, for example.

The tool body 98 may include, for example, a plastic material. The controller 99 controls an operation of the entire electric power tool (including a used state of the power source 100), and may include, for example, a CPU. The power source 100 includes one or more secondary batteries. The controller 99 allows electric power to be supplied from the power source 100 to the drill section 101 in accordance with an operation by an operation switch.

EXAMPLES

Description is given of examples of the technology. It is to be noted that the description is given in the following order.

1. Fabrication of Secondary Battery (Coin Type)
2. Fabrication of Secondary Battery (Laminated Film Type)
3. Evaluation of Battery Characteristics
4. Consideration Experimental Examples 1-1 to 1-13

The secondary batteries were fabricated, and thereafter, battery characteristics of the secondary batteries were evaluated.

<1. Fabrication of Secondary Battery (Coin Type)>

Figure 11:
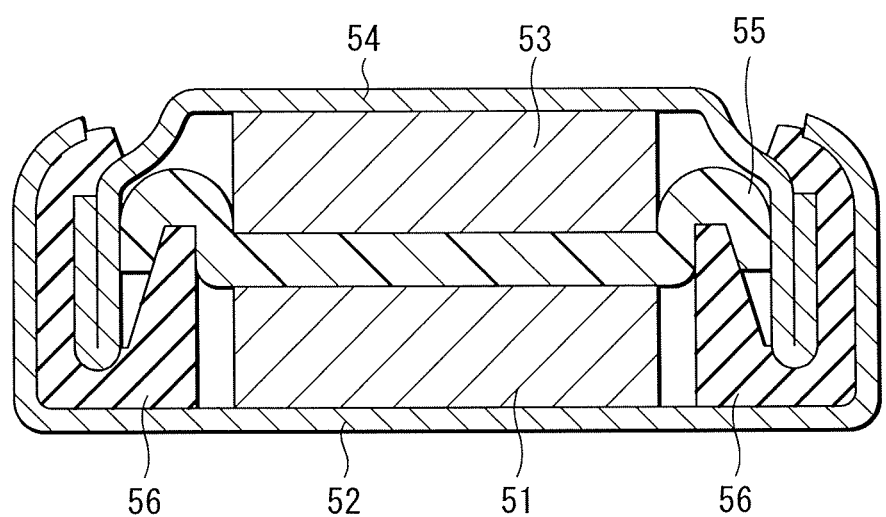
FIG. 11 is a cross-sectional view of a configuration of a test-use secondary battery (coin type).

Coin type secondary batteries illustrated in FIG. 11 were fabricated as test-use secondary batteries. In each of the secondary batteries, a test electrode 51 was contained inside an outer package can 52, and a counter electrode 53 was contained inside an outer package cup 54, as illustrated in FIG. 11. The test electrode 51 and the counter electrode 53 were stacked with a separator 55 in between, and the outer package can 52 and the outer package cup 54 were swaged with a gasket 56. Each of the test electrode 51, the counter electrode 53, and the separator 55 was impregnated with the electrolytic solution.

The counter electrode 53 was fabricated as follows. First, 90 parts by mass of a cathode active material ($LiFePO_4$ that was a lithium-containing phosphate compound), 5 parts by mass of a cathode binder (polyvinylidene fluoride), and 5 parts by mass of a cathode conductor (carbon black) were mixed to obtain a cathode mixture. Subsequently, the cathode mixture was put into an organic solvent (N-methyl-2-pyrrolidone), and thereafter, the organic solvent was stirred to obtain paste cathode mixture slurry. Subsequently, a single surface of a cathode current collector (an aluminum foil having a thickness of 12 μm) was coated with the cathode mixture slurry with use of a coating apparatus, and thereafter, the cathode mixture slurry was dried to form a cathode active material layer. Lastly, the cathode active material layer was compression-molded with use of a roll pressing machine.

The test electrode 51 was fabricated as follows. First, 90 part by mass of an anode active material ($Li_4Ti_5O_{12}$ that was a lithium-titanium composite oxide), 5 parts by mass of an anode binder (polyvinylidene fluoride), and 5 parts by mass of an anode conductor (carbon black) were mixed to obtain an anode mixture. Subsequently, the anode mixture was put into an organic solvent (N-methyl-2-pyrrolidone), and thereafter, the organic solvent was stirred to obtain paste cathode mixture slurry. Subsequently, a single surface of an anode current collector (a copper foil having a thickness of 15 μm)

was coated with the cathode mixture slurry with use of a coating apparatus, and thereafter, the cathode mixture slurry was dried to form an anode active material layer. Lastly, the anode active material layer was compression-molded with use of a roll pressing machine.

The electrolytic solution was prepared as follows. An electrolyte salt (lithium hexafluorophosphate ($LiPF_6$)) was added into a solvent (propylene carbonate, dimethyl carbonate, and ethyl methyl carbonate), and the solvent was stirred. Thereafter, a dicarbonyl compound was further added into the solvent, and the solvent was stirred. In this case, a mixture ratio (weight ratio) of the solvent was propylene carbonate: dimethyl carbonate:ethyl methyl carbonate=40:30:30, and a content of the electrolyte salt was 1 mol/kg with respect to the solvent. The kind and content (wt %) of the dicarbonyl compound are as illustrated in Table 1. In this case, as the dicarbonyl compound, the compound represented by the formula (1-1) that was the first dicarbonyl compound and the compound represented by the formula (1-14) that was the fourth dicarbonyl compound were used.

It is to be noted that for comparison, an electrolytic solution was prepared by a similar procedure, except that the dicarbonyl compound was not used, and an electrolytic solution was prepared by the similar procedure, except that another compound (vinylene carbonate (VC) that was an unsaturated cyclic carbonate ester) was used in place of the dicarbonyl compound. The presence or absence of the dicarbonyl compound, and the kind and content (wt %) of the other compound are as illustrated in Table 1.

Each of the secondary batteries was assembled as follows. First, the test electrode 51 was stamped into a pellet shape (having a diameter of 16 mm), and thereafter the pellet-shaped test electrode 51 was contained in the outer package can 52. Subsequently, the counter electrode 53 was stamped into a pellet shape (having a diameter of 15 mm), and thereafter the pellet-shaped counter electrode 53 was contained in the outer package cup 54. Subsequently, the test electrode 51 contained in the outer package can 52 and the counter electrode 53 contained in the outer package cup 54 were stacked with the separator 55 (a microporous polyolefin film having a thickness of 16 μm) impregnated with the electrolytic solution in between. Lastly, the outer package can 52 and the outer package cup 54 were swaged with the gasket 56. Thus, each of the coin type secondary batteries was completed.

<2. Fabrication of Secondary Battery (Laminated Film Type)>

Moreover, the laminated film type secondary batteries illustrated in FIGS. 3 and 4 were fabricated.

The cathode 33 was fabricated as follows. The cathode active material layers 33B were formed on both surfaces of the cathode current collector 33A by a procedure similar to the foregoing procedure of fabricating the counter electrode 53. In this case, volume density of the cathode active material layers 33B was 1.7 $g/cm^3$. The anode 34 was fabricated as follows. The anode active material layers 33B were formed on both surfaces of the anode current collector 34A by a procedure similar to the foregoing procedure of fabricating the test electrode 51. In this case, volume density of the anode active material layers 34B was 1.7 $g/cm^3$.

Each of the secondary batteries was assembled as follows. First, the cathode lead 31 made of aluminum was attached to the cathode current collector 33A by welding, and the anode lead 32 made of copper was attached to the anode current collector 34A by welding. Subsequently, the cathode 33 and the anode 34 were stacked with the separator 35 (a microporous polyethylene film having a thickness of 12 μm) in between to obtain a laminated body. Subsequently, the laminated body was spirally wound in a longitudinal direction, and the protective tape 37 was attached onto the outermost periphery of the laminated body to fabricate the spirally wound electrode body 30. Subsequently, the outer package member 40 was folded to interpose the spirally wound electrode body 30, and thereafter, the outer edges on three sides of the outer package member 40 were thermally fusion-bonded to form a pouch. The outer package member 40 used here was an aluminum laminated film in which a nylon film (having a thickness of 25 μm), an aluminum foil (having a thickness of 40 μm), and a polypropylene film (having a thickness of 30 μm) were laminated in this order from outside. In this case, the adhesive film 41 was inserted between the cathode lead 31 and the outer package member 40, and the adhesive film 41 was inserted between the anode lead 32 and the outer package member 40.

Lastly, the electrolytic solution was injected inside the pouch formed of the outer package member 40, and the spirally wound electrode body 30 was impregnated with the electrolytic solution. Thereafter, outer edges on the remaining one side of the outer package member 40 were thermally fusion-bonded in a reduced-pressure environment. Thus, the spirally wound electrode body 30 was sealed in the outer package member 40 to complete each of the laminated film type secondary batteries.

<3. Evaluation of Battery Characteristics>

Cycle characteristics and swollenness characteristics were examined to evaluate battery characteristics of the secondary batteries, and results illustrated in Table 1 were thereby obtained.

[Cycle Characteristics]

The cycle characteristics were examined as follows. A cycle test was performed with use of the coin type secondary batteries to determine a capacity retention ratio (%).

More specifically, first, each of the secondary batteries was charged and discharged in an ordinary temperature environment (at a temperature of 23° C.) to stabilize a battery state of each of the secondary batteries. Subsequently, one cycle of charge and discharge was performed on each of the secondary batteries in the same environment to measure discharge capacity at the first cycle. Thereafter, 500 cycles of charge and discharge were repeatedly performed on each of the secondary batteries in a high temperature environment (at a temperature of 45° C.). Thereafter, each of the secondary batteries were charged and discharged in the ordinary temperature environment (at a temperature of 23° C.) to measure discharge capacity at 502nd cycle. Lastly, a capacity retention ratio (%)=(discharge capacity at the 502nd cycle/discharge capacity at the first cycle)×100 was calculated.

When each of the secondary batteries was charged at each of the first cycle and the 502nd cycle, each of the secondary batteries was charged at a constant current of 0.2 C until the voltage reached 2.4 V, and thereafter, each of the secondary batteries was charged at a constant voltage of 2.4 V until the current corresponded to 1/30 of the initial current (=0.2 C). When each of the secondary batteries was discharged at each of the first cycle and the 502nd cycle, each of the secondary batteries was discharged at a constant current of 0.2 C until the voltage reached 0.5 V. It is to be noted that "0.2 C" refers to a current value at which the battery capacity (theoretical capacity) is completely discharged in 5 hours.

Charge and discharge conditions at the second to 501st cycles were similar to the charge and discharge conditions at each of the first cycle and the 502nd cycle, except that the current during charge and the current during discharge were changed to 1 C. It is to be noted that "1 C" refers to a current value at which the battery capacity is completely discharged in 1 hour.

It is to be noted that charge and discharge conditions for stabilization of the battery state of each of the secondary batteries were similar to the charge and discharge conditions at the first cycle.

[Swollenness Characteristics]

The swollenness characteristics were examined as follows. A float test was performed with use of the laminated film type secondary batteries to determine a volume change ratio (%).

More specifically, each of the secondary batteries having a battery state stabilized by the foregoing procedure was charged and discharged at an ordinary temperature environment (at a temperature of 23° C.) to measure discharge capacity. Charge and discharge conditions were similar to the charge and discharge conditions (at the first cycle) in a case where the cycle characteristics were examined.

Subsequently, each of the secondary batteries was charged again, and thereafter, a volume of that secondary battery in such a charged state (a volume before continuous charge) was measured. In this case, in a case where the foregoing discharge capacity was considered as 100%, each of the secondary batteries was charged at a constant current of 0.2 C until obtaining discharge capacity corresponding to 50% of the foregoing discharge capacity.

It is to be noted that a procedure of measuring the volume of each of the secondary batteries is as described below. First, a beaker containing water was put on an electronic balance. In this case, capacity of water was about 80% of capacity of the beaker. Subsequently, each of the secondary batteries was completely immersed in water contained in the beaker. Lastly, the volume of that secondary battery was determined on the basis of an increase in weight after immersion of the secondary battery. This procedure of measuring the volume was similarly used in the following procedure.

Thereafter, each of the secondary batteries continued being charged at an ordinary temperature environment (at a temperature of 23° C.) to measure discharge capacity. In this case, each of the secondary batteries was charged at a constant current of 0.2 C until the voltage reached 2.4 V. In other words, as described above, each of the secondary batteries was charged at a constant current until obtaining discharge capacity corresponding to 50%, and thereafter, each of the secondary batteries continued being charged at a constant current until obtaining discharge capacity corresponding to 100%.

Subsequently, each of the secondary batteries was continuously charged at a high temperature environment (at a temperature of 45° C.). In this case, each of the secondary batteries was charged at a constant voltage of 2.4 V until charge time reached 500 hours. Thereafter, each of the secondary batteries was discharged in an ordinary temperature environment (at a temperature of 23° C.). In this case, each of the secondary batteries was discharged at a constant current of 0.2 C until the voltage reached 0.5 V.

Subsequently, each of the secondary batteries was charged and discharged in the same environment. Charge and discharge conditions were similar to the charge and discharge conditions (at the first cycle) in the case where the cycle characteristics were determined.

Subsequently, each of the secondary batteries were charged again, and the volume of each of the secondary batteries in such a charged state (volume after continuous charge) was measured. In this case, in a case where the foregoing discharge capacity was considered as 100%, each of the secondary batteries was charged at a constant current of 0.2 C until obtaining discharge capacity corresponding to 50% of the foregoing discharge capacity.

Lastly, a volume change ratio (%)=[(the volume after continuous charge−the volume before continuous charge)/the volume before continuous charge]×100 was calculated.

TABLE 1

Anode active material: Lithium-titanium composite oxide ($Li_4Ti_5O_{12}$)

| Experimental Example | Dicarbonyl Compound Kind | Content (wt %) | Other Compound Kind | Content (wt %) | Capacity Retention Ratio (%) | Volume Change Ratio (%) |
|---|---|---|---|---|---|---|
| 1-1 | Formula (1-1) | 0.01 | — | — | 58.5 | 71 |
| 1-2 | | 0.2 | | | 61.1 | 59 |
| 1-3 | | 0.5 | | | 63.5 | 56 |
| 1-4 | | 1 | | | 59.9 | 55 |
| 1-5 | | 1.5 | | | 58.8 | 58 |
| 1-6 | | 5 | | | 58.1 | 64 |
| 1-7 | Formula (1-14) | 0.5 | — | — | 67.4 | 52 |
| 1-8 | — | — | — | — | 58 | 96 |
| 1-9 | — | — | VC | 0.5 | 57.6 | 84 |
| 1-10 | | | | 1 | 57 | 86 |
| 1-11 | | | | 3 | 50.3 | 95 |
| 1-12 | | | | 5 | 44.5 | 102 |
| 1-13 | Formula (1-1) | 7 | — | — | 47.5 | 98 |

<4. Consideration>

As illustrated in Table 1, in the case where the titanium-containing compound (the lithium-titanium composite oxide) was used as the anode active material, each of the capacity retention ratio and the volume change ratio largely varied depending on the composition of the electrolytic solution. Hereinafter, each of the capacity retention ratio and the volume change ratio in a case where the electrolytic solution included neither the dicarbonyl compound nor the other compound (an experimental example 1-8) is considered as a comparison reference.

More specifically, in a case where the electrolytic solution included the other compound (the unsaturated cyclic carbonate ester) (experimental examples 1-9 to 1-12), in some cases, the volume change ratio was slightly decreased, but the capacity retention ratio was decreased.

In contrast, in a case where the electrolytic solution included the dicarbonyl compound (experimental examples 1-1 to 1-7, and 1-13), each of the capacity retention ratio and the volume change ratio exhibited a different tendency depending on the content of the dicarbonyl compound in the electrolytic solution.

More specifically, in a case where the electrolytic solution included the dicarbonyl compound but the content of the dicarbonyl compound in the electrolytic solution was larger than 5 wt % (the experimental example 1-13), the capacity retention ratio was decreased, and the volume change ratio was increased.

However, in a case where the electrolytic solution included the dicarbonyl compound and the content of the dicarbonyl compound in the electrolytic solution was 5 wt % or less, more specifically from 0.01 wt % to 5 wt % both inclusive (the experimental examples 1-1 to 1-7), independent of the kind of the dicarbonyl compound, the capacity retention ratio was increased, and the volume change ratio was largely decreased. In this case, in particular, in a case where the electrolytic solution included the fourth dicarbonyl compound (the experimental example 1-7), the capacity retention ratio was further increased and the volume change ratio was further decreased.

As can be seen from the results illustrated in Table 1, in a case where the anode included the titanium-containing compound and the electrolytic solution included an appropriate amount (=from 0.01 wt % to 5 wt % both inclusive) of the dicarbonyl compound, both the cycle characteristics and the swollenness characteristics were improved. Accordingly, superior battery characteristics were obtained in the secondary battery.

Although the technology has been described above referring to some embodiments and examples, the technology is not limited thereto, and may be modified in a variety of ways.

More specifically, description has been given with reference to the cylindrical type secondary battery, the laminated film type secondary battery, and the coin type secondary battery as examples of the secondary battery of the technology. However, the secondary battery of the technology may be any other secondary battery. Non-limiting examples of the other secondary battery may include a square type secondary battery.

Moreover, description has been given with reference to an example in which the battery element has the spirally wound structure. However, the structure of the battery element in the secondary battery of the technology is not limited thereto. For example, the battery element may have any other structure such as a stacked structure.

Moreover, description has been given with reference to the lithium-ion secondary battery; however, the secondary battery is not limited thereto. The secondary battery may be, for example, a secondary battery in which capacity of an anode active material that has ability to insert and extract lithium is set smaller than capacity of a cathode to obtain capacity of an anode by the sum of capacity derived from a lithium insertion phenomenon and a lithium extraction phenomenon and capacity derived from a lithium precipitation phenomenon and a lithium dissolution phenomenon.

Moreover, description has been given with reference to the secondary battery using lithium as the electrode reactant; however, the electrode reactant is not limited to lithium. The electrode reactant may be, for example, any of other Group 1 elements such as sodium and potassium, Group 2 elements such as magnesium and calcium, and other light-metals such as aluminum.

Note that the effects described in the present specification are illustrative and non-limiting. The technology may have effects other than those described in the present specification.

It is to be noted that the technology may have the following configurations.

(1) A secondary battery, including:

a cathode;

an anode including a titanium-containing compound; and an electrolytic solution including one or more of respective dicarbonyl compounds represented by the following formulas (1), (2), (3), (4), (5), and (6), a content of the dicarbonyl compound being from 0.01 wt % to 5 wt % both inclusive,

[Chem. 19]

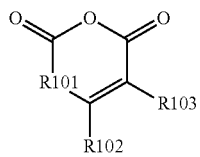
(1)

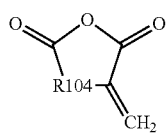
(2)

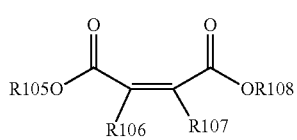
(3)

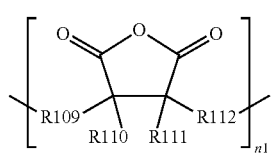
(4)

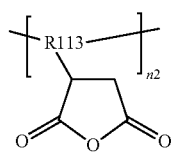
(5)

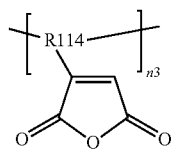
(6)

where each of R101, R104, R109, and R112 is an alkylene group, each of R102, R103, R106, R107, R110, and R111 is one of a hydrogen group, an alkyl group, a carboxyl group, and an alkylcarboxyl group, each of R105 and R108 is one of a hydrogen group, a monovalent hydrocarbon group, a silyl group ($-SiR_3$), and an alkali metal, each of R113 and R114 is a trivalent hydrocarbon group, R101 is optionally absent, and each of R109 and R112 is optionally absent, R102 and R103 are optionally bound to each other, R106 and R107 are optionally bound to each other, R110 and R111 are optionally bound to each other, each of three R's is one of a hydrogen group and a monovalent hydrocarbon group, and each of n1, n2, and n3 is an integer of 2 or more.

(2) The secondary battery according to (1), in which the monovalent hydrocarbon group is one of an alkyl group, an alkenyl group, an alkynyl group, a cycloalkyl group, an aryl group, and a monovalent group in which two or more of the alkyl group, the alkenyl group, the alkynyl group, the cycloalkyl group, and the aryl group are bound to each other, the alkali metal is one of lithium (Li), sodium (Na), potassium (K), rubidium (Rb), cesium (Cs), and francium (Fr), the trivalent hydrocarbon group is a group in which three hydrogen groups are eliminated from one of alkane, alkene, alkyne, alicyclic hydrocarbon, aromatic hydrocarbon, and a compound in which two or more of alkane, alkene, alkyne, alicyclic hydrocarbon, and aromatic hydrocarbon are bound to each other.

(3) The secondary battery according to (1) or (2), in which
the alkylene group has 1 to 6 carbons,
the alkyl group has 1 to 6 carbons, and
a portion other than a carboxyl group of the alkylcarboxyl group has 1 to 6 carbons.

(4) The secondary battery according to any one of (1) to (3), in which the dicarbonyl compound represented by the formula (1) includes one or more of respective compounds represented by the following formulas (7) and (8),

[Chem. 20]

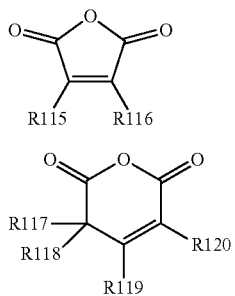

(7)

(8)

where each of R115, R116, R117, R118, R119, and R120 is one of a hydrogen group, an alkyl group, a carboxyl group, and an alkylcarboxyl group, R115 and R116 are optionally bound to each other, and any two of R117 to R120 are optionally bound to each other.

(5) The secondary battery according to any one of (1) to (4), in which the dicarbonyl compound represented by the formula (2) includes a compound represented by the following formula (9),

[Chem. 21]

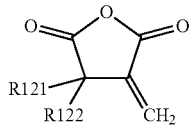

(9)

where each of R121 and R122 is one of a hydrogen group, an alkyl group, a carboxyl group, and an alkylcarboxyl group, and R121 and R122 are optionally bound to each other.

(6) The secondary battery according to any one of (1) to (5), in which the dicarbonyl compound represented by the formula (4) includes a compound represented by the following formula (10),

[Chem. 22]

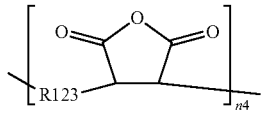

(10)

where R123 is an alkylene group, and n4 is an integer of 2 or more.

(7) The secondary battery according to any one of (1) to (5), in which the titanium-containing compound includes one or more of a titanium oxide represented by the following formula (11) and respective lithium-titanium composite oxides represented by the following formulas (12), (13), and (14), $$TiO_w \quad (11)$$

where w satisfies $1.85 \leq w \leq 2.15$, $$Li[Li_xM1_{(1-3x)/2}Ti_{(3+x)/2}]O_4 \quad (12)$$

where M1 is one or more of magnesium (Mg), calcium (Ca), copper (Cu), zinc (Zn), and strontium (Sr), and "x" satisfies $0 \leq x \leq \frac{1}{3}$, $$Li[Li_yM2_{1-3y}Ti_{1+2y}]O_4 \quad (13)$$

where M2 is one or more of aluminum (Al), scandium (Sc), chromium (Cr), manganese (Mn), iron (Fe), germanium (Ge), gallium (Ga), and yttrium (Y), and "y" satisfies $0 \leq y \leq \frac{1}{3}$, and $$Li[Li_{1/3}M3_zTi_{(5/3)-z}]O_4 \quad (14)$$

where M3 is one or more of vanadium (V), zirconium (Zr), and niobium (Nb), and "z" satisfies $0 \leq z \leq \frac{2}{3}$.

(8) The secondary battery according to any one of (1) to (7), in which the secondary battery is a lithium-ion secondary battery.

(9) A battery pack, including:
the secondary battery according to any one of (1) to (8);
a controller that controls an operation of the secondary battery; and
a switch section that switches the operation of the secondary battery in accordance with an instruction from the controller.

(10) An electric vehicle, including:
the secondary battery according to any one of (1) to (8);
a converter that converts electric power supplied from the secondary battery into drive power;
a drive section that operates in accordance with the drive power; and
a controller that controls an operation of the secondary battery.

(11) An electric power storage system, including:
the secondary battery according to any one of (1) to (8);
one or more electric devices that are supplied with electric power from the secondary battery; and
a controller that controls the supplying of the electric power from the secondary battery to the one or more electric devices.

(12) An electric power tool, including:
the secondary battery according to any one of (1) to (8); and
a movable section that is supplied with electric power from the secondary battery.

(13) An electronic apparatus including the secondary battery according to any one of (1) to (8) as an electric power supply source.

It should be understood by those skilled in the art that various modifications, combinations, sub-combinations and alterations may occur depending on design requirements and other factors insofar as they are within the scope of the appended claims or the equivalents thereof.

What is claimed is:

1. A secondary battery, comprising:
a cathode;
an anode including a titanium-containing compound; and
an electrolytic solution including one or more of respective dicarbonyl compounds represented by the following formulas (1), (2), (3), (4), (5), and (6), a content of the dicarbonyl compound being from 0.01 wt % to 5 wt % both inclusive,

[Chem. 1]

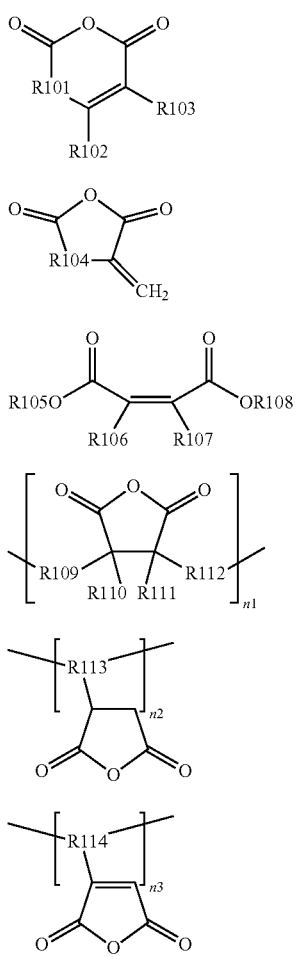

where each of R101, R104, R109, and R112 is an alkylene group, each of R102, R103, R106, R107, R110, and R111 is one of a hydrogen group, an alkyl group, a carboxyl group, and an alkylcarboxyl group, each of R105 and R108 is one of a hydrogen group, a monovalent hydrocarbon group, a silyl group (—$SiR_3$), and an alkali metal, each of R113 and R114 is a trivalent hydrocarbon group, R101 is optionally absent, and each of R109 and R112 is optionally absent, R102 and R103 are optionally bound to each other, R106 and R107 are optionally bound to each other, R110 and R111 are optionally bound to each other, each of three R's is one of a hydrogen group and a monovalent hydrocarbon group, and each of n1, n2, and n3 is an integer of 2 or more, and wherein the dicarbonyl compound represented by the formula (4) includes a compound represented by the following formula (10),

[Chem. 4]

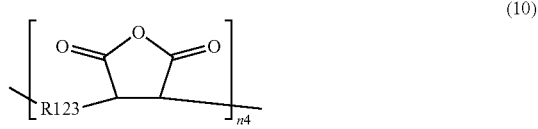

where R123 is an alkylene group, and n4 is an integer of 2 or more.

2. The secondary battery according to claim 1, wherein
the monovalent hydrocarbon group is one of an alkyl group, an alkenyl group, an alkynyl group, a cycloalkyl group, an aryl group, and a monovalent group in which two or more of the alkyl group, the alkenyl group, the alkynyl group, the cycloalkyl group, and the aryl group are bound to each other,
the alkali metal is one of lithium (Li), sodium (Na), potassium (K), rubidium (Rb), cesium (Cs), and francium (Fr),
the trivalent hydrocarbon group is a group in which three hydrogen groups are eliminated from one of alkane, alkene, alkyne, alicyclic hydrocarbon, aromatic hydrocarbon, and a compound in which two or more of alkane, alkene, alkyne, alicyclic hydrocarbon, and aromatic hydrocarbon are bound to each other.

3. The secondary battery according to claim 1, wherein
the alkylene group has 1 to 6 carbons,
the alkyl group has 1 to 6 carbons, and
a portion other than a carboxyl group of the alkylcarboxyl group has 1 to 6 carbons.

4. The secondary battery according to claim 1, wherein the dicarbonyl compound represented by the formula (1) includes one or more of respective compounds represented by the following formulas (7) and (8),

[Chem. 2]

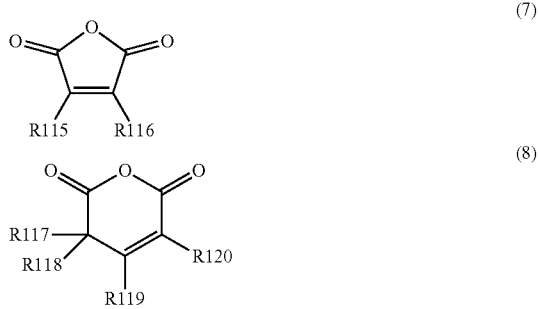

where each of R115, R116, R117, R118, R119, and R120 is one of a hydrogen group, an alkyl group, a carboxyl group, and an alkylcarboxyl group, R115 and R116 are optionally bound to each other, and any two of R117 to R120 are optionally bound to each other.

5. The secondary battery according to claim 1, wherein the dicarbonyl compound represented by the formula (2) includes a compound represented by the following formula (9),

[Chem. 3]

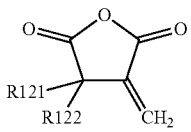
(9)

where each of R121 and R122 is one of a hydrogen group, an alkyl group, a carboxyl group, and an alkylcarboxyl group, and R121 and R122 are optionally bound to each other.

6. The secondary battery according to claim 1, wherein the titanium-containing compound includes one or more of a titanium oxide represented by the following formula (11) and respective lithium-titanium composite oxides represented by the following formulas (12), (13), and (14),

  (11)

where w satisfies $1.85 \leq w \leq 2.15$,

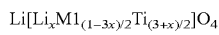  (12)

where M1 is one or more of magnesium (Mg), calcium (Ca), copper (Cu), zinc (Zn), and strontium (Sr), and "x" satisfies $0 \leq x \leq 1/3$,

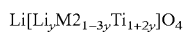  (13)

where M2 is one or more of aluminum (Al), scandium (Sc), chromium (Cr), manganese (Mn), iron (Fe), germanium (Ge), gallium (Ga), and yttrium (Y), and "y" satisfies $0 \leq y \leq 1/3$, and

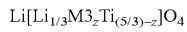  (14)

where M3 is one or more of vanadium (V), zirconium (Zr), and niobium (Nb), and "z" satisfies $0 \leq z \leq 2/3$.

7. The secondary battery according to claim 1, wherein the secondary battery is a lithium-ion secondary battery.

8. A battery pack, comprising:
a secondary battery;
a controller that controls an operation of the secondary battery; and
a switch section that switches the operation of the secondary battery in accordance with an instruction from the controller,
the secondary battery including
a cathode,
an anode including a titanium-containing compound, and
an electrolytic solution including one or more of respective dicarbonyl compounds represented by the following formulas (1), (2), (3), (4), (5), and (6), a content of the dicarbonyl compound being from 0.01 wt % to 5 wt % both inclusive,

[Chem. 5]

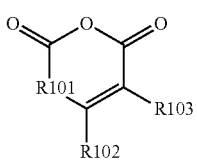
(1)

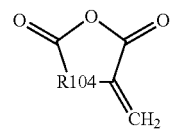
(2)

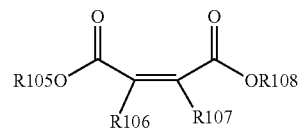
(3)

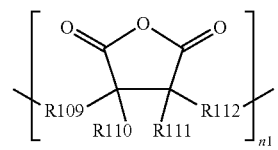
(4)

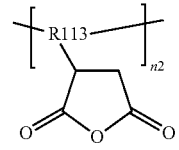
(5)

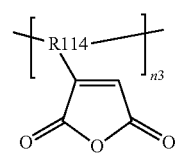
(6)

where each of R101, R104, R109, and R112 is an alkylene group, each of R102, R103, R106, R107, R110, and R111 is one of a hydrogen group, an alkyl group, a carboxyl group, and an alkylcarboxyl group, each of R105 and R108 is one of a hydrogen group, a monovalent hydrocarbon group, a silyl group (—SiR$_3$), and an alkali metal, each of R113 and R114 is a trivalent hydrocarbon group, R101 is optionally absent, and each of R109 and R112 is optionally absent, R102 and R103 are optionally bound to each other, R106 and R107 are optionally bound to each other, R110 and R111 are optionally bound to each other, each of three R's is one of a hydrogen group and a monovalent hydrocarbon group, and each of n1, n2, and n3 is an integer of 2 or more, and wherein the dicarbonyl compound represented by the formula (4) includes a compound represented by the following formula (10),

[Chem. 4]

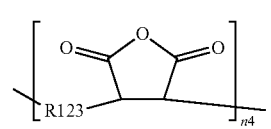
(10)

where R123 is an alkylene group, and n4 is an integer of 2 or more.

9. An electric vehicle, comprising:
a secondary battery;
a converter that converts electric power supplied from the secondary battery into drive power;

a drive section that operates in accordance with the drive power; and a controller that controls an operation of the secondary battery, the secondary battery including a cathode, an anode including a titanium-containing compound, and an electrolytic solution including one or more of respective dicarbonyl compounds represented by the following formulas (1), (2), (3), (4), (5), and (6), a content of the dicarbonyl compound being from 0.01 wt % to 5 wt % both inclusive,

[Chem. 6]

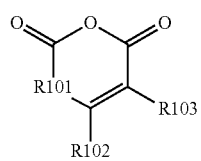
(1)

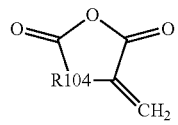
(2)

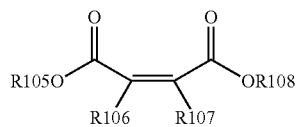
(3)

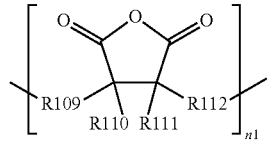
(4)

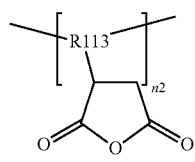
(5)

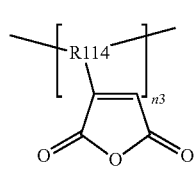
(6)

where each of R101, R104, R109, and R112 is an alkylene group, each of R102, R103, R106, R107, R110, and R111 is one of a hydrogen group, an alkyl group, a carboxyl group, and an alkylcarboxyl group, each of R105 and R108 is one of a hydrogen group, a monovalent hydrocarbon group, a silyl group (—SiR$_3$), and an alkali metal, each of R113 and R114 is a trivalent hydrocarbon group, R101 is optionally absent, and each of R109 and R112 is optionally absent, R102 and R103 are optionally bound to each other, R106 and R107 are optionally bound to each other, R110 and R111 are optionally bound to each other, each of three R's is one of a hydrogen group and a monovalent hydrocarbon group, and each of n1, n2, and n3 is an integer of 2 or more, and wherein the dicarbonyl compound represented by the formula (4) includes a compound represented by the following formula (10),

[Chem. 4]

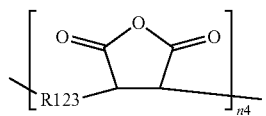
(10)

where R123 is an alkylene group, and n4 is an integer of 2 or more.

10. An electric power storage system, comprising:

a secondary battery;

one or more electric devices that are supplied with electric power from the secondary battery; and a controller that controls the supplying of the electric power from the secondary battery to the one or more electric devices, the secondary battery including a cathode, an anode including a titanium-containing compound, and an electrolytic solution including one or more of respective dicarbonyl compounds represented by the following formulas (1), (2), (3), (4), (5), and (6), a content of the dicarbonyl compound being from 0.01 wt % to 5 wt % both inclusive,

[Chem. 7]

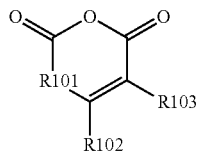
(1)

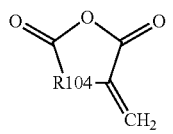
(2)

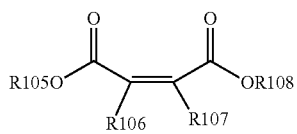
(3)

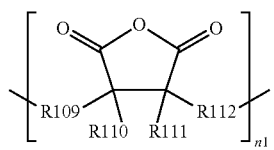
(4)

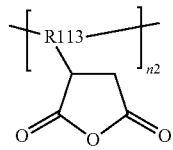
(5)

-continued (6)

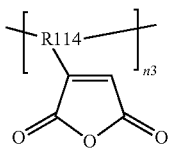

where each of R101, R104, R109, and R112 is an alkylene group, each of R102, R103, R106, R107, R110, and R111 is one of a hydrogen group, an alkyl group, a carboxyl group, and an alkylcarboxyl group, each of R105 and R108 is one of a hydrogen group, a monovalent hydrocarbon group, a silyl group (—$SiR_3$), and an alkali metal, each of R113 and R114 is a trivalent hydrocarbon group, R101 is optionally absent, and each of R109 and R112 is optionally absent, R102 and R103 are optionally bound to each other, R106 and R107 are optionally bound to each other, R110 and R111 are optionally bound to each other, each of three R's is one of a hydrogen group and a monovalent hydrocarbon group, and each of n1, n2, and n3 is an integer of 2 or more, and wherein the dicarbonyl compound represented by the formula (4) includes a compound represented by the following formula (10),

[Chem. 4]

(10)

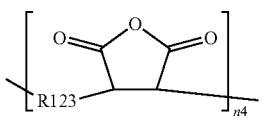

where R123 is an alkylene group, and n4 is an integer of 2 or more.

11. An electric power tool, comprising:
a secondary battery; and
a movable section that is supplied with electric power from the secondary battery,
the secondary battery including
a cathode,
an anode including a titanium-containing compound, and
an electrolytic solution including one or more of respective dicarbonyl compounds represented by the following formulas (1), (2), (3), (4), (5), and (6), a content of the dicarbonyl compound being from 0.01 wt % to 5 wt % both inclusive,

[Chem. 8]

(1)

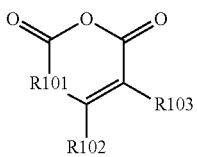

(2)

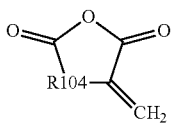

-continued (3)

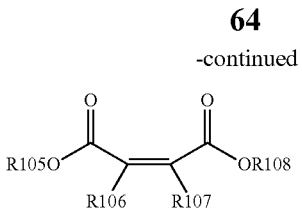

(4)

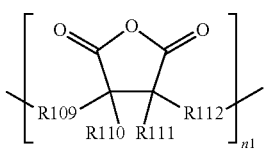

(5)

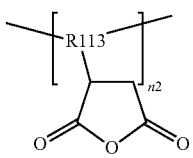

(6)

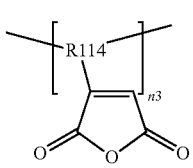

where each of R101, R104, R109, and R112 is an alkylene group, each of R102, R103, R106, R107, R110, and R111 is one of a hydrogen group, an alkyl group, a carboxyl group, and an alkylcarboxyl group, each of R105 and R108 is one of a hydrogen group, a monovalent hydrocarbon group, a silyl group (—$SiR_3$), and an alkali metal, each of R113 and R114 is a trivalent hydrocarbon group, R101 is optionally absent, and each of R109 and R112 is optionally absent, R102 and R103 are optionally bound to each other, R106 and R107 are optionally bound to each other, R110 and R111 are optionally bound to each other, each of three R's is one of a hydrogen group and a monovalent hydrocarbon group, and each of n1, n2, and n3 is an integer of 2 or more, and wherein the dicarbonyl compound represented by the formula (4) includes a compound represented by the following formula (10),

[Chem. 4]

(10)

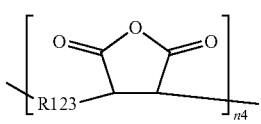

where R123 is an alkylene group, and n4 is an integer of 2 or more.

12. An electronic apparatus comprising a secondary battery as an electric power supply source, the secondary battery including
a cathode,
an anode including a titanium-containing compound, and
an electrolytic solution including one or more of respective dicarbonyl compounds represented by the following formulas (1), (2), (3), (4), (5), and (6), a content of the dicarbonyl compound being from 0.01 wt % to 5 wt % both inclusive,

[Chem. 9]

(1) 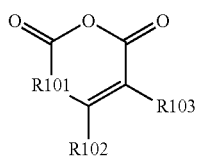

(2) 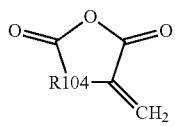

(3) 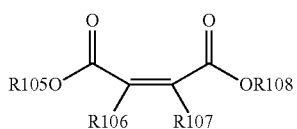

(4) 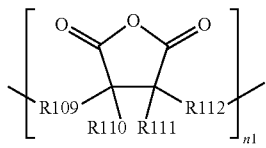

(5) 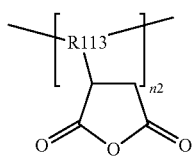

(6) 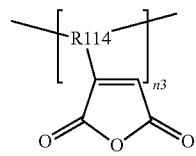

where each of R101, R104, R109, and R112 is an alkylene group, each of R102, R103, R106, R107, R110, and R111 is one of a hydrogen group, an alkyl group, a carboxyl group, and an alkylcarboxyl group, each of R105 and R108 is one of a hydrogen group, a monovalent hydrocarbon group, a silyl group ($-SiR_3$), and an alkali metal, each of R113 and R114 is a trivalent hydrocarbon group, R101 is optionally absent, and each of R109 and R112 is optionally absent, R102 and R103 are optionally bound to each other, R106 and R107 are optionally bound to each other, R110 and R111 are optionally bound to each other, each of three R's is one of a hydrogen group and a monovalent hydrocarbon group, and each of n1, n2, and n3 is an integer of 2 or more, and wherein the dicarbonyl compound represented by the formula (4) includes a compound represented by the following formula (10),

[Chem. 4]

(10) 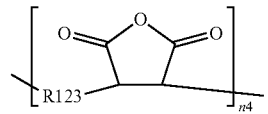

where R123 is an alkylene group, and n4 is an integer of 2 or more.

* * * * *